US012020416B2

United States Patent
Addington et al.

(10) Patent No.: US 12,020,416 B2
(45) Date of Patent: Jun. 25, 2024

(54) SYSTEM AND METHOD FOR MEASURING A SURFACE IN CONTOURED GLASS SHEETS

(71) Applicant: GLASSTECH, INC., Perrysburg, OH (US)

(72) Inventors: Jason C. Addington, Sylvania, OH (US); Benjamin L. Moran, Perrysburg, OH (US); Michael J. Vild, Toledo, OH (US)

(73) Assignee: Glasstech, Inc., Perrysburg, OH (US)

( * ) Notice: Subject to any disclaimer, the term of this patent is extended or adjusted under 35 U.S.C. 154(b) by 650 days.

(21) Appl. No.: 17/262,574

(22) PCT Filed: Jul. 24, 2019

(86) PCT No.: PCT/US2019/043180
§ 371 (c)(1),
(2) Date: Jan. 22, 2021

(87) PCT Pub. No.: WO2020/023599
PCT Pub. Date: Jan. 30, 2020

(65) Prior Publication Data
US 2021/0304396 A1    Sep. 30, 2021

Related U.S. Application Data

(60) Provisional application No. 62/702,617, filed on Jul. 24, 2018.

(51) Int. Cl.
*G01B 11/24* (2006.01)
*G01N 21/64* (2006.01)
(Continued)

(52) U.S. Cl.
CPC ............ *G06T 7/0006* (2013.01); *G01B 11/24* (2013.01); *G01N 21/6456* (2013.01);
(Continued)

(58) Field of Classification Search
CPC ............... G06T 7/0006; G06T 7/593; G06T 2207/10064; G06T 2207/30164;
(Continued)

(56) References Cited

U.S. PATENT DOCUMENTS

| 4,746,020 A | 5/1988 | Schenk |
| 5,243,402 A | 9/1993 | Weber et al. |

(Continued)

FOREIGN PATENT DOCUMENTS

| CN | 101676232 B | 4/2014 |
| CN | 103936265 B | 6/2016 |

(Continued)

OTHER PUBLICATIONS

Rantoson et al., Optimization of transparent objects digitization from visible fluorescence ultraviolet induced, Mar. 2012, Optical Engineering 51(3), 033601 (Year: 2012).*

(Continued)

*Primary Examiner* — Said M Elnoubi
(74) *Attorney, Agent, or Firm* — Brooks Kushman P.C.

(57) ABSTRACT

An optical inspection system is provided for an ultraviolet laser and associated optics forming a planar laser sheet directed to a glass sheet. The planar laser sheet intersects a surface of the glass sheet thereby causing the surface of the glass sheet to fluoresce and form a visible wavelength line on the surface. A camera has an image sensor for detecting the visible wavelength line. A control system in configured to receive image data indicative of the visible wavelength line, analyze and triangulate the data to determine a series of coordinates associated with the line, and create a three-dimensional map of the surface of the glass sheet as a function of the series of coordinates. Methods for using an optical inspection system, for gauging a surface using an optical inspection system, and for providing optical reflectance information for a surface using an optical inspection system are also provided.

20 Claims, 9 Drawing Sheets

(51) Int. Cl.
| | | |
|---|---|---|
| *G01N 21/958* | (2006.01) | |
| *G06T 7/00* | (2017.01) | |
| *G06T 7/593* | (2017.01) | |
| *H04N 13/111* | (2018.01) | |
| *H04N 13/128* | (2018.01) | |
| *H04N 13/243* | (2018.01) | |
| *H04N 13/254* | (2018.01) | |

(52) U.S. Cl.
CPC .......... *G01N 21/958* (2013.01); *G06T 7/593* (2017.01); *H04N 13/111* (2018.05); *H04N 13/128* (2018.05); *H04N 13/243* (2018.05); *H04N 13/254* (2018.05); *G01N 2021/9586* (2013.01); *G06T 2207/10064* (2013.01); *G06T 2207/30164* (2013.01)

(58) Field of Classification Search
CPC ................ G01B 11/24; G01B 11/2545; G01N 21/6456; G01N 21/958; G01N 2021/9586; G01N 21/64; G01N 21/17; G01N 21/33; G01N 21/8851; H04N 13/111; H04N 13/128; H04N 13/243; H04N 13/254
See application file for complete search history.

(56) References Cited

U.S. PATENT DOCUMENTS

| | | | |
|---|---|---|---|
| 5,289,267 | A | 2/1994 | Busch et al. |
| 5,416,589 | A | 5/1995 | Fysogorski |
| 5,438,417 | A | 8/1995 | Busch et al. |
| 5,463,464 | A | 10/1995 | Ladewski |
| 5,465,153 | A | 11/1995 | Ladewski |
| 5,517,575 | A | 5/1996 | Ladewski |
| 5,566,243 | A | 10/1996 | Baller et al. |
| 5,680,217 | A | 10/1997 | Yli-Vakkuri |
| 6,226,080 | B1 | 5/2001 | Takeuchi et al. |
| 6,275,286 | B1 | 8/2001 | Haubold et al. |
| 6,392,754 | B1 | 5/2002 | Pingel et al. |
| 6,437,357 | B1 | 8/2002 | Weiss et al. |
| 6,448,549 | B1 | 9/2002 | Safaee-Rad |
| 6,501,546 | B1 | 12/2002 | Weiss |
| 6,509,967 | B1 | 1/2003 | Pingel et al. |
| 6,512,239 | B1 | 1/2003 | Weiss et al. |
| 6,570,651 | B1 | 5/2003 | Haubold et al. |
| 6,633,377 | B1 | 10/2003 | Weiss et al. |
| 7,292,332 | B2 | 11/2007 | Gerstner et al. |
| 7,453,563 | B2 | 11/2008 | Rudert et al. |
| 7,499,812 | B2 | 3/2009 | Ersue et al. |
| 7,554,678 | B2 | 6/2009 | Pingel et al. |
| 7,602,507 | B2 | 10/2009 | Ersue et al. |
| 7,639,349 | B2 | 12/2009 | Ersue et al. |
| 7,796,276 | B2 | 9/2010 | Schipke et al. |
| 7,920,257 | B2 | 4/2011 | An et al. |
| 8,059,151 | B2 | 11/2011 | Ersue et al. |
| 8,064,069 | B2 | 11/2011 | Wienand et al. |
| 8,242,477 | B2 | 8/2012 | Lopatin |
| 8,284,396 | B2 | 10/2012 | Rudert |
| 8,295,585 | B2 | 10/2012 | Wienand et al. |
| 8,427,656 | B2 | 4/2013 | Hullin et al. |
| 8,520,067 | B2 | 8/2013 | Ersue |
| 9,091,533 | B2 | 7/2015 | Bachem et al. |
| 9,535,002 | B2 | 1/2017 | Kubiak |
| 9,618,671 | B2 | 4/2017 | Gaydoul et al. |
| 9,709,390 | B2 | 7/2017 | Uxen et al. |
| 9,797,833 | B2 | 10/2017 | Weigt |
| 9,818,021 | B2 | 11/2017 | Kubiak et al. |
| 9,992,840 | B2 | 6/2018 | Wolfing et al. |
| 10,289,895 | B2 | 5/2019 | Kubiak et al. |
| 2007/0002313 | A1 | 1/2007 | Berg et al. |
| 2007/0216332 | A1 | 9/2007 | Lambert et al. |
| 2009/0129682 | A1 | 5/2009 | Ersue et al. |
| 2011/0057120 | A1 | 3/2011 | Ostendarp et al. |
| 2012/0098959 | A1 | 4/2012 | Addington |
| 2015/0070487 | A1 | 3/2015 | Agbuga |
| 2015/0085080 | A1* | 3/2015 | Hollenbeck ........ G01B 11/2545 348/47 |
| 2015/0109615 | A1 | 4/2015 | Muller et al. |
| 2017/0124715 | A1* | 5/2017 | Tin .......... G06T 7/521 |
| 2018/0209918 | A1 | 7/2018 | Tarantino |
| 2019/0082516 | A1 | 3/2019 | Wolfing et al. |
| 2019/0178816 | A1 | 6/2019 | Kubiak et al. |
| 2019/0385295 | A1* | 12/2019 | Nakanishi ......... G06T 7/40 |

FOREIGN PATENT DOCUMENTS

| | | | | |
|---|---|---|---|---|
| CN | 205426762 | U | 8/2016 | |
| CN | 207215615 | U | 4/2018 | |
| CN | 108053367 | A * | 5/2018 | .......... G06T 3/4007 |
| DE | 10061070 | A1 | 6/2002 | |
| DE | 4301546 | C2 | 8/2002 | |
| DE | 10045105 | C2 | 9/2002 | |
| DE | 10111729 | A1 | 9/2002 | |
| DE | 20307305 | U1 | 7/2003 | |
| DE | 102004005019 | A1 | 8/2005 | |
| DE | 202005003352 | U1 | 7/2006 | |
| DE | 102005009606 | A1 | 8/2006 | |
| DE | 102005010552 | B4 | 1/2007 | |
| DE | 19511707 | B4 | 9/2007 | |
| DE | 10104355 | B4 | 2/2010 | |
| DE | 202009017763 | U1 | 5/2010 | |
| DE | 102010021853 | B4 | 4/2012 | |
| DE | 102015105128 | A1 | 10/2016 | |
| DE | 102018108874 | A1 | 10/2019 | |
| EP | 747664 | A2 * | 12/1996 | ......... G01B 11/2545 |
| EP | 0763406 | B1 | 2/2000 | |
| EP | 0911603 | B1 | 6/2001 | |
| EP | 0747664 | B1 | 8/2001 | |
| EP | 2363684 | A1 | 9/2011 | |
| EP | 2691799 | B1 | 8/2020 | |
| FR | 2975776 | A1 | 5/2011 | |
| GB | 2559157 | A | 8/2018 | |
| JP | S63229313 | A | 9/1988 | |
| JP | H8334319 | A | 12/1996 | |
| JP | 2007128467 | A | 5/2007 | |
| JP | 2010053030 | A | 3/2010 | |
| JP | 2018009888 | A | 1/2018 | |
| RU | 2467283 | C2 | 11/2012 | |
| RU | 2467310 | C2 | 11/2012 | |
| WO | 2006092320 | A2 | 9/2006 | |
| WO | 2010096890 | A1 | 9/2010 | |
| WO | 2012098430 | A1 | 7/2012 | |
| WO | 2015155070 | A1 | 10/2015 | |
| WO | 2015169730 | A1 | 11/2015 | |
| WO | 2017075275 | A1 | 5/2017 | |

OTHER PUBLICATIONS

European Extended Search Report for Application No. 19839886.9, dated Feb. 25, 2022, 8 pages.
Indian First Examination Report for Application No. 202117003847, dated Dec. 19, 2022, 7 pages.
Alexa et al., "Computing and Rendering Point Set Surfaces", IEEE Tvcg 9(1), Jan. 2003, 12 pages.
Fleishman et al., "Bilateral Mesh Denoising", School of Computer Science, Tel Aviv University, 2003, 4 pages.
International Preliminary Report for PCT Application No. PCT/US2019/043180, dated Feb. 4, 2021, 10 pages.
International Search Report and Written Opinion for PCT Application No. PCT/US2019/043180, dated Oct. 15, 2019, 11 pages.
Jones et al., "Non-Iterative, Feature-Preserving Mesh Smoothing", ACM SIGGRAPH, 2003, 7 pages.
Lancaster et al., "Surfaces Generated by Moving Least Squares Methods", Mathematics of Computation, vol. 37, No. 155, Jul. 1981, 18 pages.
Liu et al., "Automatice least-squares projection of points onto point clouds with applications in reverse engineering", Computer-Aided Design 38, 2006, pp. 1251-1263.
Miyazaki, "Measuring Surface Shape of Transparent Objects Based on the Analysis of Polarization, Thermal Radiation and Geometrical

(56) References Cited

OTHER PUBLICATIONS

Property", A Master Thesis, Graduate School of the University of Tokyo, Feb. 5, 2002, 83 pages.
Rantoson et al, "Optimization of transparent objects digitization from visible fluorescence UV-induced", Optical Engineering, Mar. 2012, 16 pages.
Fleishman et al., "Robust Moving Least-squares Fitting with Sharp Features", 2005, 9 pages.
Taubin, "A Signal Processing Approach To Fair Surface Design", IBM T.J. Watson Research Center, 1995, 8 pages.
Xu et al., "A geometry and optical property inspection system for automotive glass based on fringe patterns", Optica Applicata, vol. XL, No. 4, 2010, 15 pages.
Yagou et al., "Mesh Smoothing via Mean and Median Filtering Applied to Face Normals", Proceeding of the Geometric Modeling and Processing—Theory and Applications, 2002, 8 pages.
Zhao et al., "Parameters influence of windshield curvature on pedestrian head injuries based on reverse engineering", IOP Conf. Series, Journal of Physics, Series 1213, 2019, 7 pages.
Russian Notice of Acceptance and Search Report and English translation for Application No. 2021103034, dated Jan. 25, 2023, 19 pages.
Israel Office Action for Application No. 280324, dated Nov. 19, 2023, 4 pages.
Taiwan Office Action and Search Report and English translation for Application No. 108137112, dated Nov. 22, 2023, 19 pages.
Japanese Office Action and English translation for Application No. 2021-503154, dated Sep. 5, 2023, 13 pages.
Mexican Examination Report for Application No. MX/a/2021/000993, dated Dec. 13, 2023, 10 pages.

\* cited by examiner

SYSTEM AND METHOD FOR MEASURING A SURFACE IN CONTOURED GLASS SHEETS

CROSS-REFERENCE TO RELATED APPLICATIONS

This application is the U.S. national phase of PCT Appln. No. PCT/US2019/043180 filed Jul. 24, 2019, which claims the benefit of U.S. Provisional Application No. 62/702,617 filed Jul. 24, 2018, the disclosures of which are hereby incorporated in their entirety by reference herein.

TECHNICAL FIELD

Various embodiments relate to a system and method for measuring a surface of a contoured glass sheet.

BACKGROUND

Manufacturers of glass sheets, particularly glass sheets formed into various curved shapes for use as automotive windshields, backlites, and sidelites, are interested in measuring and evaluating the surface of a glass sheet. Manufacturers may desire to determine if the glass sheet is within a predefined specification for gauging. Manufacturers may also desire to measure and evaluate an amount of reflected optical distortion in the formed sheets that might be perceived by a human observer, such as an outside observer or the operator or passenger in a vehicle in which the glass may be mounted as the windshield, backlite, or sidelite, or the like. For example, gauging metrics and reflected distortion thresholds are becoming tighter and tighter with the increased use of technology such as heads up displays in vehicle applications. Manufacturers, as well, desire to identify small marks or other defects that are visible on the surfaces of the formed glass sheets.

SUMMARY

In an embodiment, an optical inspection system is provided with an ultraviolet laser and associated optics forming a planar laser sheet directed to a glass sheet. The planar laser sheet intersects a surface of the glass sheet thereby causing the surface of the glass sheet to fluoresce and form a visible wavelength line on the surface. A camera has an image sensor for detecting the visible wavelength line across at least a portion of a width of the sheet. A control system is configured to (i) receive image data indicative of the visible wavelength line from the camera, (ii) analyze the data from the camera to determine first and second coordinates in a series of coordinates associated with the line, (iii) triangulate a third coordinate associated with each of the first and second coordinates in the series of coordinates, and (iv) create a three-dimensional map of the surface of the glass sheet as a function of the series of coordinates.

In another embodiment, a method of using an optical inspection system is provided. A planar laser sheet is formed and directed from an ultraviolet laser and associated optics to a surface of a glass sheet. The surface of the glass sheet is excited at an intersection of the planar laser sheet and the surface to form a visible wavelength line on the surface of the glass sheet. The visible wavelength line is imaged using a camera. First and second coordinates in a series of coordinates associated with the visible wavelength line are determined by analyzing imaging data from the camera. A third coordinate associated with each of the first and second coordinates in the series of coordinates associated with the visible wavelength line is determined by triangulation. A three-dimensional map is created of the surface of the glass sheet as a function of the series of coordinates.

In yet another embodiment, a method of gauging a surface using an optical inspection system is provided. A dataset comprising a set of coordinates corresponding to a location on a surface of a glass sheet is calculated by triangulating a position of a fluoresced line on the surface imaged using a camera, with the fluoresced line created at an intersection of a planar laser sheet from an ultraviolet laser with the surface. A three-dimensional map of the surface is created as a function of a series of the datasets. An invariant metric is calculated using the dataset in comparison with a gauge model for the surface. The invariant metric is output.

In another embodiment, a method of providing optical reflectance information for a surface using an optical inspection system is provided. A dataset comprising a set of coordinates corresponding to a location on a surface of a glass sheet is calculated by triangulating a position of a fluoresced line on the surface imaged using a camera, with the fluoresced line created at an intersection of a planar laser sheet from an ultraviolet laser with the surface. A three-dimensional map of the surface is created as a function of a series of the datasets. The three-dimensional map of the surface is denoised. An invariant metric is calculated using datasets from the denoised map in comparison with an optical reflectance specification designated for the surface of the glass sheet G. The invariant metric is output.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
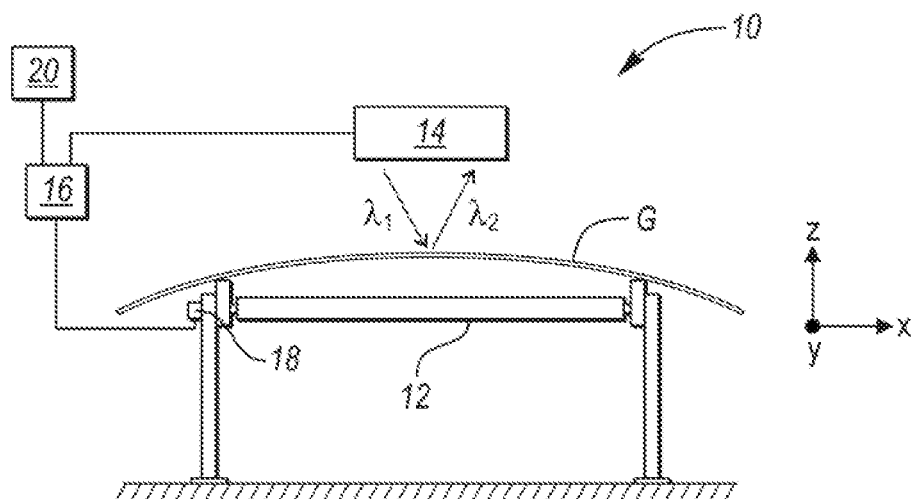
FIG. 1 is a schematic view of an embodiment of a glass sheet inspection system according to an embodiment.

FIG. 1 illustrates an on-line glass sheet optical inspection system 10. The inspection system 10 includes a conveyor 12 which conveys the glass sheet G in a first direction generally parallel to a first dimension of the glass sheet. In the example shown, the contoured glass sheet G is a generally rectangular vehicle windshield or backlight, having a first dimension which is the relatively smaller dimension (and which may alternatively be referred to as the height) and a second, relatively larger dimension (which may alternatively be referred to as the width). The glass sheet G has a thickness in the third dimension, with the thickness being smaller than the width and the height. The glass sheet G is curved about one or more axes of curvature that are generally parallel to the first direction. In other examples, the glass sheet G may have other axes of curvature, or be provided as a flat or substantially flat sheet.

The conveyor 12 may be a single conveyor dedicated solely to transporting the glass sheet G through the inspection system 10 which may be configured and/or operated as a stand-alone optical inspection system. In other examples, the conveyor 12 may be one of a series of conveyors which convey the glass sheet through a variety of process stations, such as, for example, heating, forming, and annealing or tempering stations found in a typical automotive, architectural and/or solar glass sheet fabrication systems. The conveyor for the glass sheet G may be provided by various techniques such as by roller, air-float, or belt conveyors, positioners, and robotic arms, in order to handle the glass in the manner described. It will also be appreciated that a plurality of conveyors, each of which may be independently controlled to move the glass sheets through the different processing stations at speeds to efficiently govern the flow and processing of the glass sheets throughout system 10.

Alternatively, the inspection system 10 may be provided as a separate, stand-alone system or apparatus without a conveyor. The inspection system 10 may also be provided with a fixture for the glass panel G, with the inspection system 14 configured to translate relative to the panel G, e.g. with the optical system 14 mounted on a conveyor system. The inspection system 10 may be provided with the glass panel G and the optical system 14 fixed relative to one another, with the optical system having optical elements configured to scan the surface of the glass panel G.

The inspection system 10 has an optical system 14 that is used to identify and measure the surface of a glass sheet, and may be further used to gauge the sheet, identify and measure small defects in the sheet, and/or measure reflective optical distortion. The inspection system 14 is described in detail with reference to FIG. 2.

Generally, the optical system 14 includes a laser or other light source with a wavelength selected at least in part based on the optical properties of the glass sheet G. Light from the light source is directed to the glass sheet G by the optical system 14. In one example, the light source is selected to have a wavelength $\lambda_1$ in a tuned, narrow band to which that glass sheet G is opaque or generally non-transmissive. The light source is also selected such that the wavelength $\lambda_1$ of the light source induces or causes the surface of the glass sheet G to emit light at a wavelength $\lambda_2$ that is different than the light source. For example, the light source is selected such that the wavelength $\lambda_1$ of the light source induces or causes the surface of the glass sheet G to fluoresce or luminesce at a wavelength $\lambda_2$ that is longer than the wavelength $\lambda_1$ of the light source.

The optical system 14 has at least one camera or other detector to detect the light emitted from the glass sheet G. The optical system 14 also includes various optical elements to control and direct light from the light source to the glass sheet G, and from the glass sheet G to the detector.

The optical system 14 has at least one computer and/or control unit that includes at least one processor program to execute logic for controlling the optical system, including the light source and the detector, acquiring data from the detector for each glass sheet, analyzing the data for the glass sheet, and providing information related to the surface shape, reflective optical distortion, or other surface information or defects for the glass sheet. The computer may be integrated with the control system 16 for the inspection system 10 as shown, or may be provided as a separate device in communication with the control system 16.

The optical system 14 therefore provides a non-contact inspection system for rapidly acquiring detailed data corresponding to the surface of a glass sheet G and analyzing the acquired surface data to assess and report on the surface shape of the glass sheet G as well as properties related to the optical characteristics of the glass sheet G, particularly as the glass sheet G is being transported on a conveyor 12 between or after bending, cooling, or other processing operations.

The inspection system 10 includes a programmable control unit 16, depicted in this embodiment as a computer. The computer 16 may be in communication with or integrated with the computer of the optical system 14. The computer 16 includes at least one processor programmed to detect the glass sheet as it advances on the conveyor, and control the motor(s) to control the movement and speed of the conveyor 12.

The conveyor 12 moves the glass sheet G along a path or in a direction, shown here as the y-direction, past the optical system 14. The conveyor 12 is moved using one or more motors and support rollers or other devices.

The inspection system 10 has one or more position sensors 18 to determine a location and timing of the conveyor 12 for use in analyzing the glass sheet G using the optical system 14 as it moves through the system 10. The position sensor(s) 18 may be provided by a digital encoder, an optical encoder, or the like. The speed of the conveyor 12 and of the glass sheet G may be selected to allow sufficient residence time of the light from the optical system 14 light source onto a region of the surface of the glass sheet G to cause the surface to fluoresce, while maintaining the line operation for the glass sheet G. In one example, the conveyor 12 is continuously moved at a speed of 0.1 to 0.2 meters/second, or at a rate that coordinates with the optical system 14 to acquire data based on a specified movement of the glass panel G, e.g. movement within the range of 1-4 mm. In further examples, the conveyor 12 is moved such that a glass panel G may be inspected within a time frame on the order of ten to fifteen seconds. In another example, the conveyor is continuously moved at a speed of 0.01 meters/second or more to acquire data based on a movement of the glass panel G on the order of five millimeters or less. Data from the glass sheet may be acquired based on varying movements of glass panel G, corresponding to a grid size, and may be less than five millimeters, less than two millimeters, on the order of one millimeter, or another value. In a further example, the speed of the conveyor may be increased such that data is acquired based on a movement of the glass panel G on the order of more than five millimeters, e.g. having a grid size of more than five millimeters, or more than ten millimeters. As the speed of the conveyor decreases, the time to scan a panel G increases, and may be on the order of seconds, tens of seconds, or minutes, e.g. two minutes. The time to scan a panel may likewise increase for a glass panel G with complex surface contours, as the resolution may need to be increased using a smaller grid size. The position sensors 18 may be used as an input to the optical system 14 to determine timing for data acquisition, e.g. as a trigger for a camera.

The inspection system 10 may be provided with additional sensors, such as a photoelectric sensor or the like, in communication with the control system 16 to determine that a glass sheet G is in the appropriate position on the conveyor 12, or has advanced to the optical system 14. The computer 16 then communicates with the optical system 14 to activate the system 14 and begin measuring a surface of the sheet G. In other examples, the optical system 14 may be continuously operating and begin acquiring and processing data related to a glass sheet G in response to the system 14 detector registering appropriate signals indicating that the light source has begun to interact with the glass sheet G.

Figure 2:
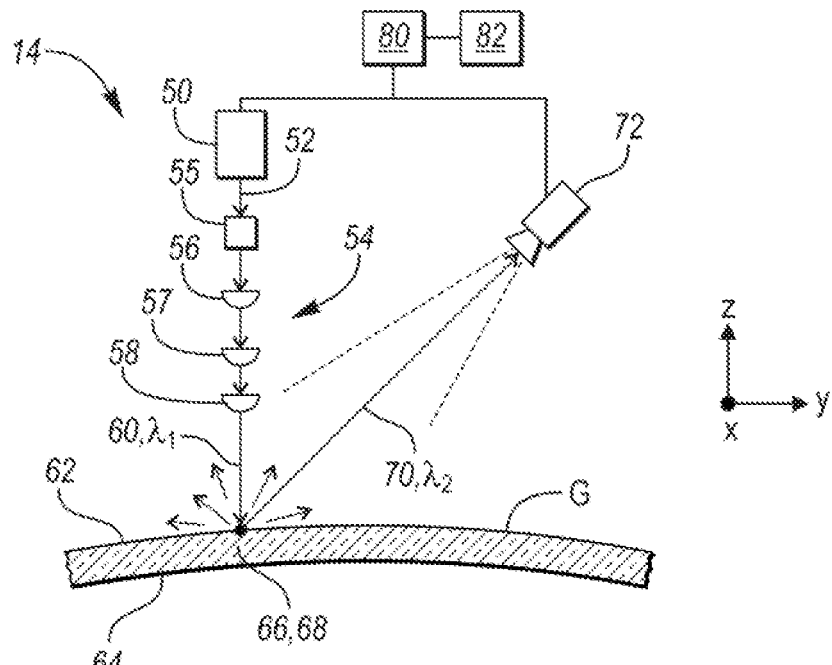
FIG. 2 is a schematic view of an optical system for use with the inspection system of FIG. 1 according to an embodiment.
Figure 3:
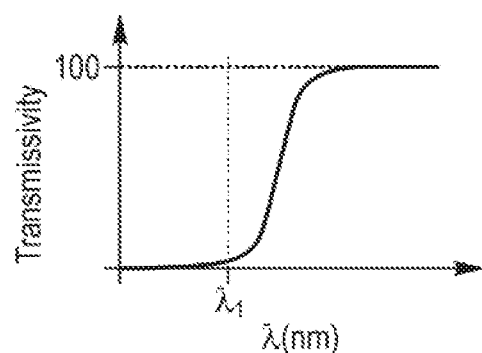
FIG. 3 is a graph illustrating optical transmissivity of a glass sheet for use in the systems of FIGS. 1 and 2.
Figure 4:
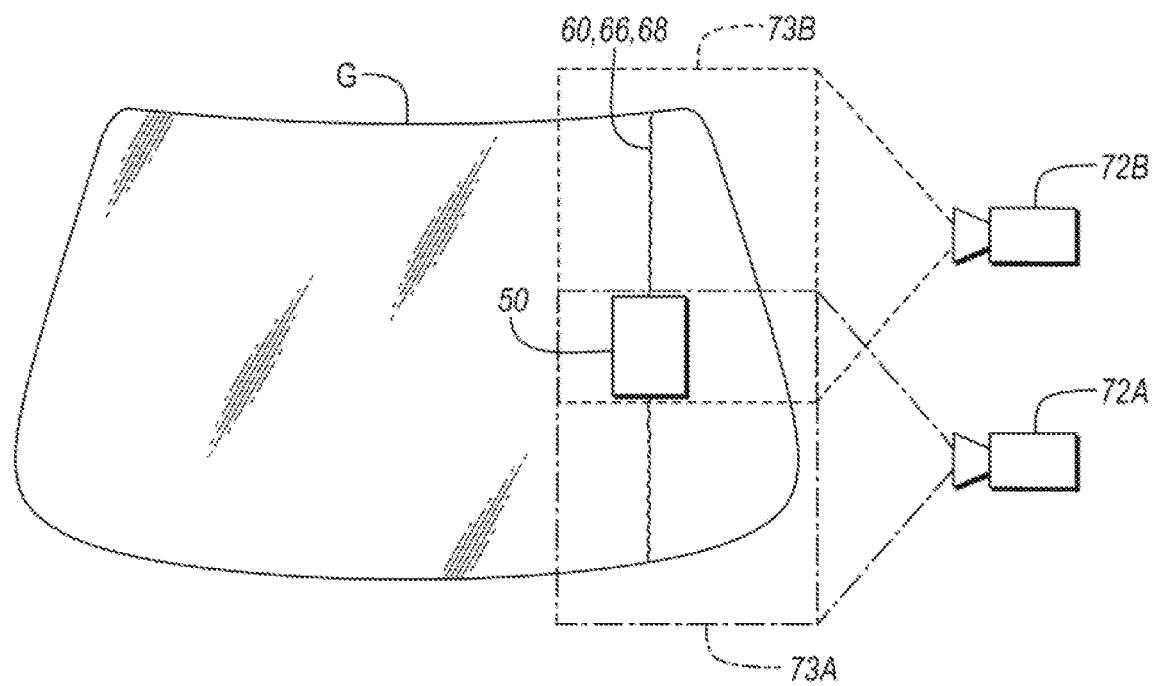
FIG. 4 is a schematic view of another optical system for use with the inspection system of FIG. 1.

Referring now to FIGS. 2-4, the optical system 14 is described in greater detail according to various embodiments. In the disclosed embodiments, the light source is provided by a laser 50, and may be a diode laser. The laser 50 may be packaged with a diode laser with the appropriate mount and lens to provide a collimated beam, and may additionally be provided with a heat sink. In other embodiments, the laser 50 may be provided by another laser or combination of lasers configured to provide the desired wavelength of laser light at the desired laser intensity and other beam parameters. In further embodiments, the light source may be provided as an ultraviolet light source, with associated filters and optical elements to provide a light sheet directed to the glass sheet G. In further embodiments, the system 14 may be provided with more than one laser 50.

Based on intended use for a glass sheet G formed from soda lime silicate glass, the laser 50 is selected to have a wavelength in the ultraviolet range and at a specific wavelength to which the glass sheet G is opaque or non-transmissive, or to which the glass sheet G is substantially non-transmissive, e.g. with less than 5% or 2% transmissivity for the laser output. In the disclosed example, the laser 50 is provided by a pulsed diode solid state laser that is tuned to output light at a center wavelength $\lambda_1$. The center wavelength may be selected to correspond with opacity or non-transmissivity of the glass sheet G, and may be a non-visible wavelength, and is also selected to induce fluorescence or luminescence of the glass sheet G surface. The center wavelength may be less than 350 nanometers, and in one example is provided as 266 nanometers, in the ultraviolet range.

In one example, the laser has a power output of 150 microjoules at 15 kiloHertz. In further examples, the laser 50 may be provided at other power outputs and repetition rates, and lasers with center wavelengths of 266 nm at 500-100 microjoules and one kilohertz or more are contemplated. The system 10, 14 may be configured to measure a glass sheet G within a specified time period, for example, on the order of ten seconds per sheet, although other times are also contemplated based on the size of the sheet and the desired resolution of the model. Of course, other wavelengths may be selected based on the composition of the glass sheet G.

FIG. 3 illustrates a chart for soda lime silicate glass with transmissivity plotted against wavelength of incident light. As can be seen from the Figure, the transmissivity of the glass sheet G shows a sharp decrease and approaches an opaque material as the wavelength of incident light decreases. The wavelength of the laser 50 is also plotted on the chart, and the glass sheet G is shown as being opaque at this wavelength. For a glass sheet G having another bulk material composition, a laser 50 tuned to another wavelength may be selected for use with the optical inspection system 14 such that the selected wavelength is non-transmissive through the sheet G, and induces luminescence or fluorescence in the sheet G.

Referring back to FIG. 2, optical elements 54 are provided downstream of the laser 50 to interact with, shape, and direct the laser beam towards the glass sheet G. The optical elements 54 may include one or more beam shapers, lenses, mirrors, and the like. In the disclosed embodiment, a beam shaper 55 is provided to increase uniformity of the laser intensity by converting the collimated Gaussian beam profile of the laser beam to a collimated flat top profile beam with a more uniform intensity distribution and without internal laser focusing, thereby resulting in increased uniformity of the laser line intensity across the surface of the glass sheet G. A first lens 56 is provided to form a planar laser sheet from the laser beam 52. In the disclosed embodiment, the first lens 56 is a cylindrical plano-concave lens with a focal length selected based on the positioning of the laser 50 relative to the conveyor and glass sheet, or distance D1 from the laser 50 to the glass sheet G. In order to further focus the planar laser sheet, a second lens 58 may also be provided. In the disclosed embodiment, the second lens 58 may be a cylindrical plano-concave lens to further focus the planar laser sheet. An additional focusing lens 57 may be provided to narrow and focus the laser sheet. Although the second lens 58 is illustrated as being subsequent to or downstream of the first lens 56, in other embodiments, the positioning of the lenses 56, 57, 58 may be varied or reversed such that the second lens 58 is prior to the first lens 56. The lenses 56, 57, 58 are used to form a focused, planar laser sheet 60 that is directed to a first surface 62 of the glass sheet G at a tuned center wavelength $\lambda_1$ of 266 nanometers based on the opacity of the material forming the glass sheet G. In the example shown, the optical elements 56, 57, 58 are provided by an f=−8 mm plano-concave cylindrical lens, an f=1000 mm plano-convex cylindrical focusing lens, and an f=−25 mm plano-concave cylindrical lens, respectively. The optical elements 54 cooperate to form a planar laser sheet with a beam width of 1-2 mm on the surface of the glass sheet G. In another example, the optical elements may have different focal lengths, and the focal lengths and lens selection may be based in part on the size of the panel G. In other embodiments, additional optical elements such as filters, choppers, and the like may be provided between the laser 50 and the glass sheet G.

Alternatively, or additionally, other optical elements, such as a Powell lens may be used to provide a more uniform distribution of laser intensity along the planar laser sheet. Furthermore, although one laser 50 is shown in FIGS. 2-4, the system 14 may be provided with more than one laser 50 in other embodiments. For example, the system 14 may have two lasers 50, directed to different regions of the glass sheet G, or with the beams aligned to form a common sheet across the glass sheet G. The intensity of the laser sheet varies across the laser sheet from one laser, e.g. as a distribution, and multiple lasers may be used to provide a more uniform intensity across the surface of the glass sheet G, or to provide a fluorescent line for multiple respective cameras.

The glass sheet G has first and second surfaces 62, 64 that form the first and second sides of the glass sheet G. The first and second surfaces 62, 64 are spaced apart from one another by the thickness of the glass sheet G. As the glass sheet G is opaque or substantially non-transmissive to the wavelength $\lambda_1$ of the laser sheet 60, the laser sheet 60 interacts with the first surface 62 without traveling through the sheet G or to the second surface 64, and therefore excites the glass sheet G only at the first surface 62. The thickness of the glass sheet G, or distance between the first and second surfaces 62, 64, may vary and in some examples is greater than 1.2 mm or greater than 1.6 mm, and in one non-limiting example lies within the range of 1.6-25 mm.

The planar laser sheet 60 may be oriented to extend transversely to the belt, or in the x-direction. The laser sheet 60 interacts with the first surface 62 of the glass sheet G along path 66, or the intersection of the laser sheet 60 and the first surface 62 of the glass sheet G. For a planar glass sheet G, the path 66 is linear. For a curved glass sheet G, the path 66 may vary with the curvature of the sheet G along the surface 62 as the laser sheet 60 interacts with the curved surface.

The laser sheet 60 excites material of the glass sheet G at the first surface 62 and causes luminescence at the first surface 62. The glass sheet G fluoresces along the laser line 66 excitation to emit a wavelength $\lambda_2$ that is longer than $\lambda_1$. In the present example, the emitted light 70 from the glass sheet G is at a wavelength $\lambda_2$ that is in the visible range or in the near-ultraviolet range, and appears as a line 68 along the surface 62 and line 66 of excitation.

The emitted light 70 is detected by a detector such as a camera 72. The camera may be provided with a charge-coupled device (CCD) image sensor or a complementary metal-oxide semiconductor (CMOS) image sensor. In the present example and as shown in FIG. 2, the detector 72 is provided with a CMOS sensor and is positioned such that the entire width of the glass sheet G, or glass sheet in the x-direction is captured in an image. In the example shown, the camera is provided by a CMOS sensor camera at 5496×3672 pixels that is set to a region of interest of 5496×1836 or 5496×1000 pixels in one example, or is a CMOS sensor at 5120×5120 pixels in another example. Various camera settings may be controlled based on the laser parameters, conveyor speed, and other system factors, and these camera settings include lens focal length, aperture, gain, and exposure times. In one example, the camera uses a fixed lens, e.g. a 16 mm or 25 mm lens, and is set to an f2.4 aperture or higher apertures for increased depth of field, and uses an exposure time of 15-20 milliseconds with a gain of 2-15 decibels. In another example, the camera settings may use another exposure time, e.g. within a range of 10 milliseconds to 300 milliseconds or more, and the gain may likewise be set to another value within a range of two to thirty decibels. In other examples, the camera 72 may be positioned to image only a selected region of the sheet G. In further examples, the detector may be provided as another photodetector or photosensing element. In further examples, additional optical elements, such as filters, may be provided between the glass sheet G and the detector 72 to further increase the signal-to-noise ratio.

Figure 5:
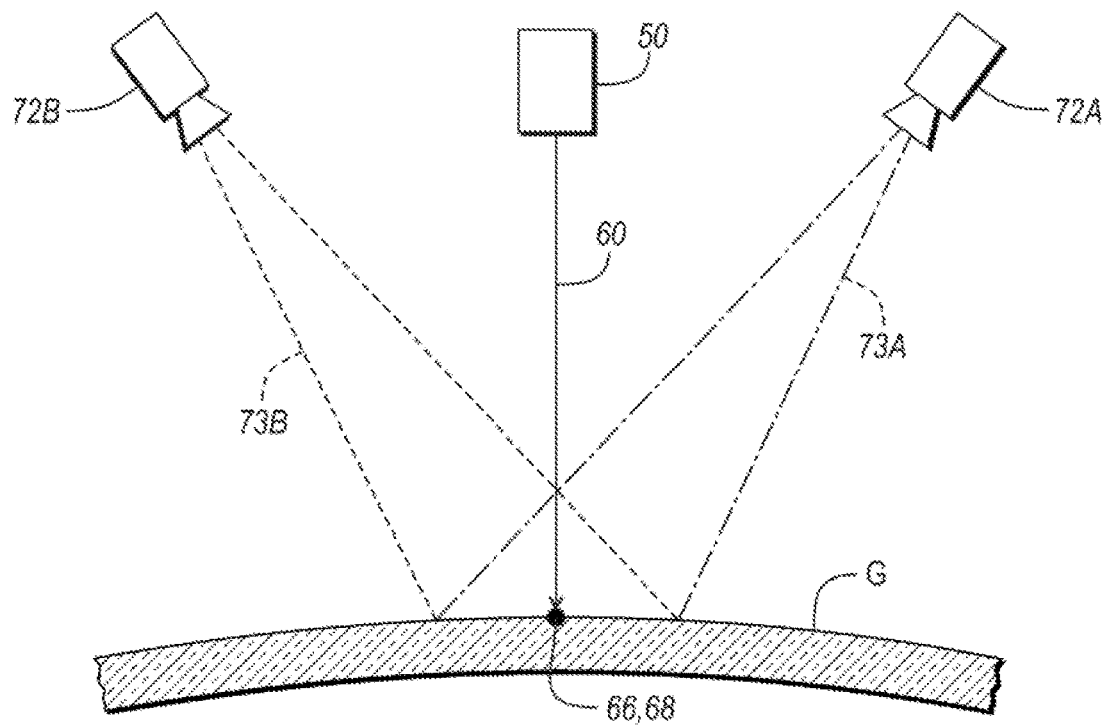
FIG. 5 is a schematic view of another optical system for use with the inspection system of FIG. 1.

In other examples and as shown in FIGS. 4-5, the optical system 14 may use more than one camera 72. FIGS. 4-5 are schematics and do not illustrate various system 14 components such as optical elements, controllers, etc. In FIG. 4, a pair of cameras 72A, 72B positioned on one side of the laser sheet 60. Each camera 72A, 72B images a region 73A, 73B of the glass sheet G, with the regions overlapping one another, e.g. by approximately 10 cm. By using more than one camera in the system of FIG. 3, errors introduced by optical distortion may be reduced in the final surface map of the surface of the glass sheet G based on a longer focal length for each camera. Furthermore, the use of optical system 14 with two or more cameras may also provide for higher resolution imaging of the glass surface, e.g. increased pixels per unit surface area of the glass sheet G, and increased accuracy and sensitivity as the cameras are physically located closer to the glass sheet G.

In FIG. 5, a pair of cameras 72A, 72B are provided, with the laser sheet 60 positioned between the cameras 72A, 72B. Each camera 72A, 72B images a region 73A, 73B of the glass sheet G, with the regions overlapping one another, e.g. by approximately 10 cm. By using more than one camera in the system of FIG. 3, errors introduced by optical distortion may be reduced in the final surface map of the surface of the glass sheet G. Furthermore, the cameras 72A, 72B are positioned to image glass sheets G with a high degree of curvature, e.g. when one camera 72A may have an obstructed view of, or is at a small angle of incidence or a glancing angle relative to, the left-hand side of the surface of the sheet G in FIG. 4. In further embodiment, the system 14 may have more than two cameras. For example, it is envisioned that four cameras 72 may be provided, with two on each side of the laser sheet 60, and the regions of all four cameras overlapping one another. In other examples, more than four cameras 72 may be present.

Referring back to FIG. 2, the laser 50 and the camera 72 are in communication with at least one computer 80 in a control unit. The computer 80 may be connected to or integrated with the control system 16 or the inspection system 10. The computer 80 has an image processor unit 82 and is also connected to memory. The computer 80 may receive information from the control system 16 and the position sensors for use determining when to send trigger signals to the camera(s) 72 of FIGS. 2, and 4-5. For example, the camera(s) may acquire data at a frame rate of up to 80 fps, or up to 160 fps, based on a corresponding movement of 1-4 millimeters for the glass sheet G.

The computer 80 receives image data from the camera 72. The computer 80 forms a matrix or point cloud using data from the image, e.g. cells in the matrix associated with positions on the surface 62 of the glass sheet, or as an array of points in the point cloud associated with positions on the surface 62 of the glass sheet. The image data may be provided as a series of greyscale values, with each value ranging from 0 to 255, if based on an 8-bit greyscale. In other examples, the image data may be provided as a series of RGB signals corresponding to each of the red, green and blue segments or color components as detected by the camera sensor, may be provided based on a different color space and color model, or may be provided as another bit value. Further details of the data acquisition, and data processing pre-cloud and post-cloud are provided below with reference to FIGS. 6-13.

Figure 6:
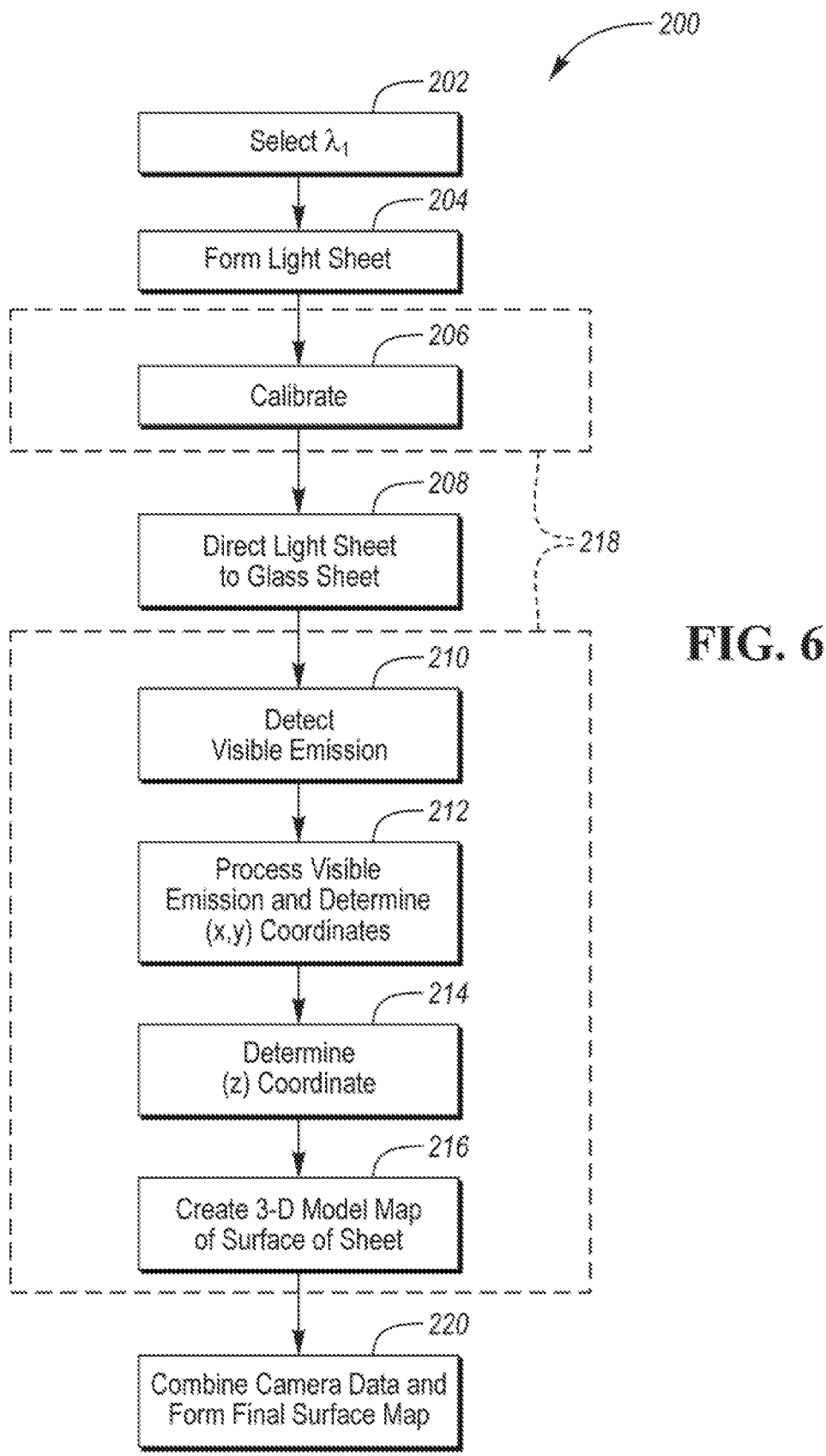
FIG. 6 is a flow chart of a method of measuring a surface of a glass sheet using the systems of FIGS. 1, 2, 4, and 5 according to an embodiment.
Figure 7:
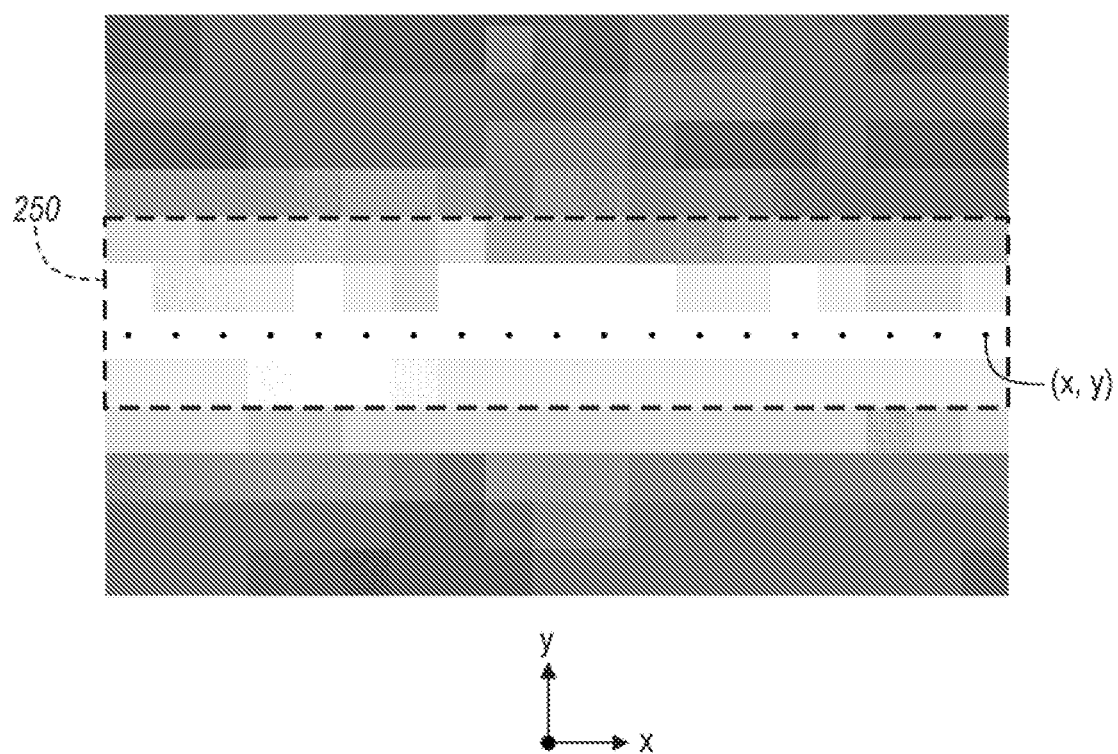
FIG. 7 is a portion of a visible spectrum image of a glass sheet surface taken using the system of FIG. 2.

FIG. 6 illustrates a flow chart of a method 200 for using an optical inspection system according to an embodiment for determining a three-dimensional map of a surface of the glass sheet G. In various embodiments, the method 200 may be used with the systems 10, 14 of FIGS. 1-2 and 4-5, respectively, and steps may be rearranged or omitted or additional steps may be added according to various embodiments.

At step 202, a first wavelength, such as an ultraviolet wavelength, is selected based on the transmissivity of the glass sheet, with the first wavelength selected to be substantially non-transmissive through the glass sheet. At step 204, a planar light sheet is formed at the first wavelength, for example, using an ultraviolet laser.

At step 206, the optical system 14 is calibrated. The camera(s) and the laser(s) are each calibrated. A checkerboard chart or other known, planar calibration surface is provided in place of the glass sheet G and at approximately a middle z-distance of the glass sheet G, or in the middle of a bounding box defined for the camera(s). The bounding box for the cameras is defined as a three-dimensional space which allows for sufficient vertical depth or depth of field to contain the upper and lower bounds of the glass sheet G, while omitting any underlying support surfaces of fixtures. In one example, the bounding box has a depth of approximately 10-15 cm, although other dimensions are envisioned based on the specifics of the part.

The position of the calibration chart is therefore known and provides the basis for a global coordinate system for the bounding box. The camera is calibrated based on a stationary calibration chart, and camera settings are selected including focal length, exposure, aperture, gain, and the like.

The laser is also calibrated. For a laser that is oriented with the laser sheet extending along the z-axis, or in a x-z plane, the camera(s) detect the location of the laser sheet relative to the calibration chart and associates this position with the global coordinate system. For a laser that is not in the x-z plane, additional gauging steps may be needed to provide the laser sheet position to the global coordinate system. Laser settings are selected including intensity and frequency. The camera and laser calibration relative to the calibration chart and global coordinate system are later used with reference to the determination of z-coordinate of the surface at step 214.

At step 208, the planar light sheet is directed to a glass sheet, for example using associated optics, and the surface of the glass sheet is excited such that light is emitted at a second wavelength, such as a visible wavelength, along a path of intersection between the planar light sheet and the surface of the glass sheet facing the light source.

At step 210, a series of data indicative of a series of visible wavelength lines is measured or detected using one or more cameras, with each camera imaging a region of interest of the glass sheet G. For a single camera system 14, the camera 72 may detect each line detected across the panel, or in a region of interest on the panel. For a multi-camera system 14, each camera 72 may be directed to separate, overlapping regions of interest of the glass sheet G and detect each line within the region of interest.

At step 212, each visible wavelength line is processed and analyzed to determine first and second coordinates, e.g. (x, y) coordinates, in a series of coordinates associated with each line, and the coordinates are stored in a matrix or point cloud associated with the camera.

The computer 80 processes the image using the image processor unit 82. A section of a representative sample image is provided in FIG. 7 with associated schematic overlays based on the image processing described below.

The computer 80 and image processor 82 may process the image to reduce noise, for example, by applying thresholds to the image, normalizing the image, transforming the image using a fast Fourier transform, and the like. In one example, the image is filtered using a median filter for noise reduction, including speckle noise. The need for a noise reduction step may increase with increased camera gain settings.

The computer 80 and image processor 82 select a line width region in the image based on an indicated line width size input and a minimum intensity. By selecting a line width region, a reduced region of the image is used in processing and determining coordinates in later steps. For example, the indicated line width may be selected as a nominal value with a tolerance factor. In one example, the nominal line width is selected in the range of 3-10 pixels, and the tolerance is selected in the range of 1-5 pixels. In another example, the nominal line width is selected in the range of 4-6 pixels, and the tolerance is selected in the range of 2-3 pixels. In a further example, the indicated line width is selected as having a minimum width of one pixel. The intensity is also selected as an input and may be based in part on an expected intensity of the fluoresced line at the associated frame rate, and to eliminate pixels containing background noise from being included unnecessarily. In various examples, the minimum intensity is selected on a greyscale of $5/255$, $10/255$, $20/255$, $30/255$, or another value. An example of a selected line width region is shown as region 250 in FIG. 7.

While the glass sheet G is transparent to the light emitted at the visible, second wavelength $\lambda_2$, and the light emitted from the surface 62 may pass through and/or reflect from the other surface 64, experiments have shown that any reflection from the rear surface 64 has a very low signal and may generally be lost as noise. For example, reflections of the emitted line 68 on the rear surface 64 are on the order of 5 out of 255 on a greyscale in the captured image, while the primary emission line 68 is on the order of 20-100 out of 255 on the greyscale, such that the reflected signal may be considered noise. Furthermore, based on the position of the reflected line in the image and spacing from the primary visible line, the reflected line may be excluded from or outside the bounds of the selected line width region 250 such that it is not further considered in the data processing. For cases where the reflected line is sufficiently close to the emitted line 68 such that it cannot be reasonably excluded using the line width region 250, the reflected line may be included in the data processing; however, the data processing is not significantly affected due to the low signal of the reflected line. Alternatively and in the presence of a second reflected line, the data processing may select the fluorescing line by accounting for the camera geometry, the location of the lines based on panel, the higher brightness of the fluoresced line in comparison to the reflected line, and other factors. The data processing may further receive an input as to the material of the panel G. For example, a reflected line may be expected for an image of tin-side float glass, while a reflected line may not be present for an image of air-side float glass.

The computer 80 and image processor 82 determine or calculate points along a model line based on the image data and the greyscale levels of the pixels in the visible fluoresced line. As can be seen from the sample image, the emitted light from the surface 62 may be captured as extending across multiple pixels in the y-direction within the region 250. As such, the computer 80 calculates the points for a model line based on the greyscale values in the pixels as a series of coordinates or (x, y) datasets. The calculated points in the model line 100 are overlaid on FIG. 4 by way of example.

In one example, the computer and image processor may average groups of adjacent pixels to find each point and (x, y) dataset as an estimated center of the model line, and may provide one (x, y) dataset for each pixel in the x-direction in the image. In other examples, the computer and image processor may conduct a weighted average of pixels to find each point and (x, y) datasets as an estimated center of the line. The computer and image processor may calculate the points and (x, y) datasets using a distribution function with the pixel values, such as a Gaussian distribution, average or mean widths, or other mathematical functions. The computer and image processor may alternatively use a known, commercially available imaging library processing tool or software to determine values for the datasets using the pixel data.

The computer 80 then inputs the series of (x, y) datasets into associated cells in the matrix, or into a point cloud. The dataset may include a series of coordinates from the model line as determined from the image. Each dataset may include an (x, y) value corresponding to the location of the surface 62 of the glass sheet G in an x-y plane that collectively define the model line 100 and is linked to the global coordinate system.

The matrix may be filled similarly to a linescan image, with each row in the matrix filled using the coordinates from a model line from each image from the glass sheet G, and with subsequent images filling subsequent rows. Likewise, a point cloud may be constructed from sequential images of a glass sheet G. In one example, the matrix may have a cell and set of coordinates associated with each pixel in the x-direction from the image. In other examples, the matrix may have one cell and set of coordinates associated with multiple adjacent pixels, such that the computer conducts an averaging step or the like prior to entering the data. In some examples, the matrix or point cloud may be thinned, for example, by omitted every nth dataset collected.

At step 214, a third coordinate, such as a (z) coordinate, is triangulated using a position of the laser, a position of the camera, and the first and second coordinates, and is stored in the matrix or point cloud. The computer 80 then calculates a z-value for each set of (x, y) coordinates associated with the z-location of that set of coordinates on the surface 62 of the glass sheet G. The z-value is calculated using the (x, y) values from a set of coordinates in each cell as well as the positioning of the laser and camera from the inspection system 14 in a triangulation calculation as described below with reference to FIGS. 8A-8B. The computer inputs the (z) values into the associated cells in the matrix with the corresponding (x, y) coordinates to complete the map of the surface 62. The computer and image process may calculate the (z) value for each set of coordinates as the image is processed at step 212, or may calculate the (z) values for all of the datasets in the matrix or point cloud after the glass sheet has been imaged in its entirety.

Figure 8A:
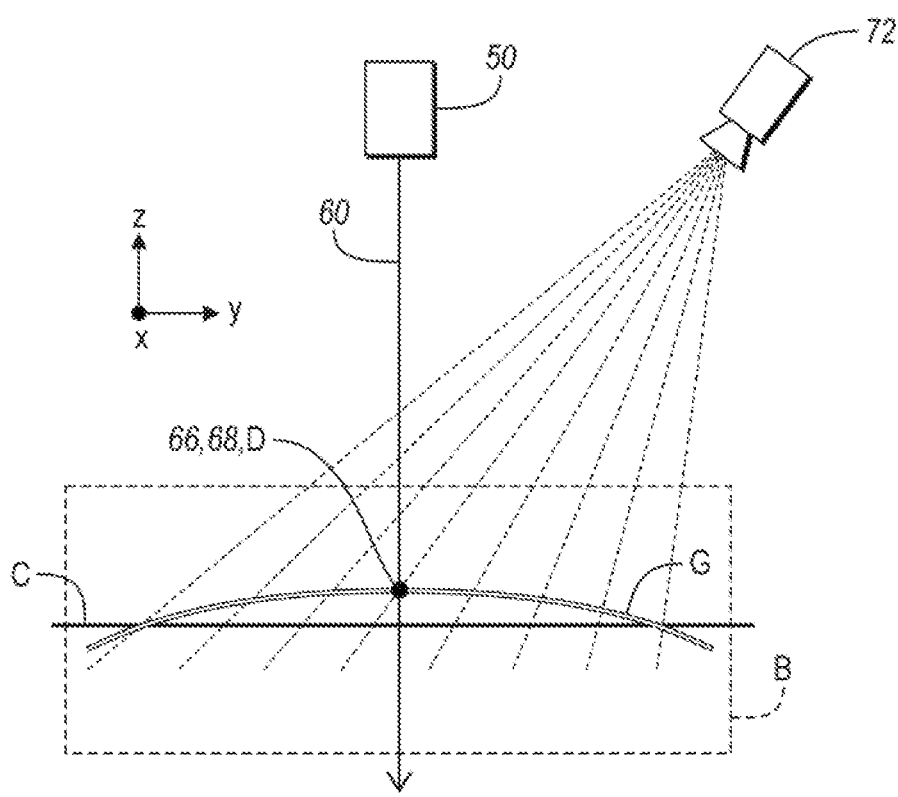
FIGS. 8A and 8B are schematics of the optical inspection system of FIGS. 1-2 for use in triangulating a third coordinate.
Figure 8B:
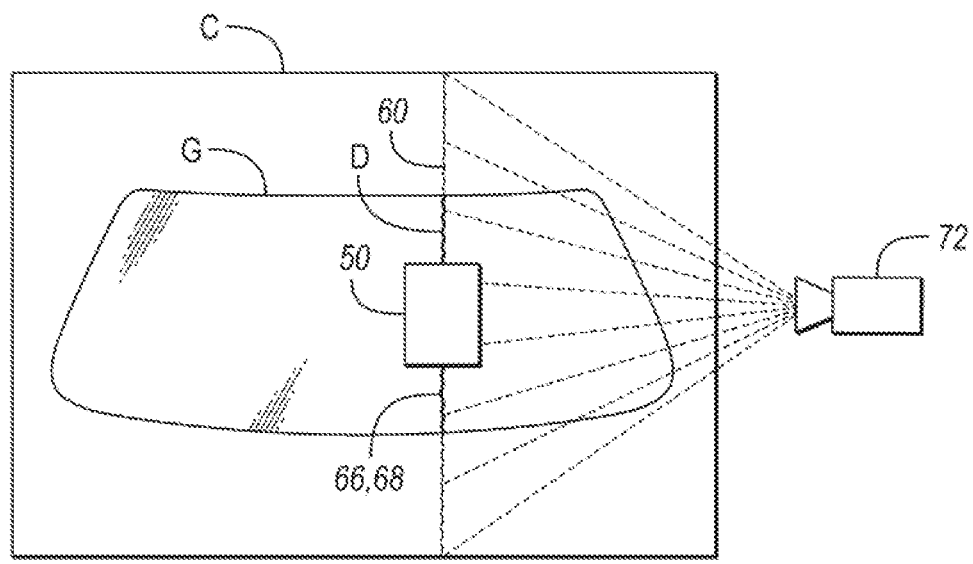

FIGS. 8A-8B illustrate several views related to triangulation of a third (z) coordinate for association with first and second (x, y) coordinates in a dataset D in the series of coordinates for each calculated line from an image, such as shown in FIG. 4. The laser 50 and the camera 72 may be fixed relative to one another, with the laser beam and resulting planar laser sheet also fixed, such that the glass sheet G is translated or moved relative in a direction y relative to the optical system 14 and through the planar laser sheet. As the location of the laser sheet and camera were calibrated and linked to a global coordinate system, the z-coordinate may be calculated.

FIG. 8A is a side schematic of the optical system 14 with a calibration chart C overlaid with a glass sheet G, and also illustrates a bounding box B. The laser sheet 60 is referenced relative to the calibration chart C and global coordinate system. Likewise, each pixel in the camera is referenced to the calibration chart C and the global coordinate system, such that each pixel has an associated vector in the (x, y, z) space. The (x, y) coordinates for a dataset D may be determined using step 212 above and tied to the global coordinate system based on the schematic shown in FIG. 8B. The z-coordinate for the dataset D in the global coordinate system may then be calculated using the intersection of the laser sheet 60 and the vector for the associated pixel in comparison with where the pixel and vector would intersect the calibration chart C, with reference to the schematic in FIG. 8A and using triangulation techniques. The z value is therefore calculated for each (x, y) coordinate in the series of coordinates along the line, and the control system 80 then inputs this z coordinate into the matrix cell or point cloud with the (x, y) values already present for each point in the line.

At step 216, a three-dimensional map of the surface of the glass sheet is then created from the matrix or point cloud as a function of the series of coordinates for each of the series of visible wavelength lines for a glass sheet G for the camera.

Steps indicated by region 218 are performed for each camera, or data from each camera. For a single camera system, step 216 results in a final matrix or point cloud for the surface of the glass panel G.

Figure 9:
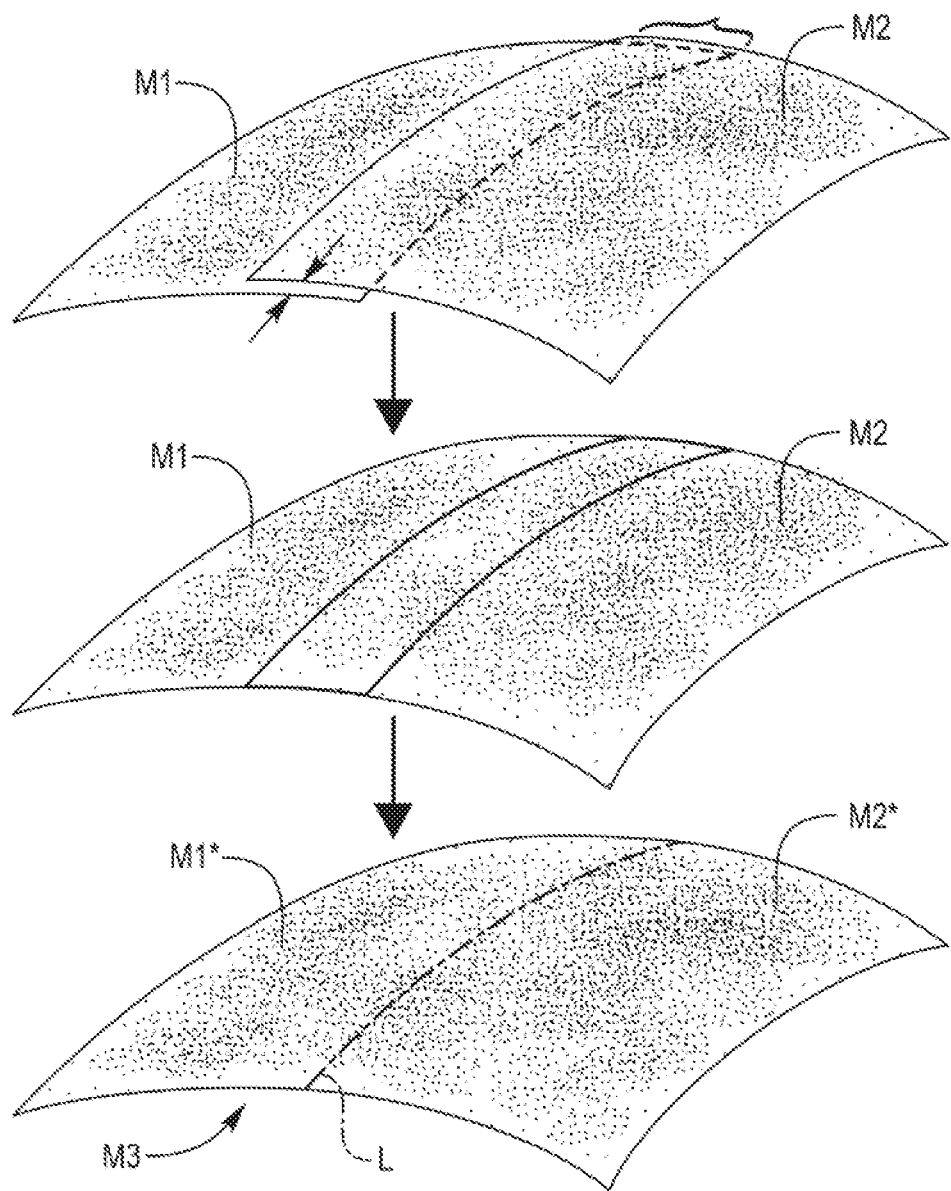
FIG. 9 is a schematic illustrating a data alignment step sequence for multi-camera systems for use with the method of FIG. 7 according to an embodiment.

For a multi-camera system 214, an additional step 220 is provided to combine the matrices or point clouds from the different cameras into a single matrix or point cloud representative of the glass sheet G. FIG. 9 illustrates a schematic of a sub-routine used at step 220 to align multiple matrices or point clouds, for example, using a two-camera system as shown in FIG. 4. A sub-routine for aligning multiple matrices or point clouds for a two-camera system as shown in FIG. 5, or a system with another number of cameras, is similar and would apparent to one of ordinary skill in the art based on the method 220 as described herein and the example shown in FIG. 9.

FIG. 9 illustrates a schematic diagram for step 220 for method 200. The computer 80 loads two matrices or point clouds M1, M2 as acquired from two cameras 72A, 72B, respectively, from a scan of a glass sheet G. In other examples, more than two matrices or point clouds may be combined using techniques similar to those described herein. As can be seen from FIG. 9A, the matrices M1, M2 are overlapped as the camera 72A, 72B fields of view are overlapped with one another. Furthermore, although the system has been calibrated with at least one point in the calibration chart provided in each camera region 73A, 73B, and preferable with a degree of overlap between the regions, when the matrices M1, M2 are overlaid with one another, there may be a small degree of offset between points in the overlapped section. In order to form a final matrix representative of the surface of the glass sheet G, the computer processes the matrices M1, M2 to resolve the offset. In one example, the offset being resolved may be as small as on the order of a thousandth of an inch. Furthermore, the offset may vary across the overlapped region.

In FIG. 9B, the computer moves one or both of the matrices or point clouds M1, M2. In one example, the computer 80 moves one of the matrices using a rigid transformation to translate and/or rotate it relative to the other matrix such that two overlap regions are aligned with one another as shown and the error or misalignment is reduced.

In FIG. 9C, the computer 80 then creates a final matrix or point cloud M3 for the glass sheet G. In one example, the computer removes the points from the overlap region from one or the other matrix. In another example, and as shown, the computer uses a line L correlating to the common calibration point for the matrices and uses points from one matrix to fill the final matrix on one side of the line L as sub-matrix M1*, and uses points from the other matrix to fill the final matrix on the other side of the line L as sub-matrix M2*.

As the laser light does not pass through the glass sheet G, only the surface 62 facing the inspection system luminesces. As such, the matrix with series of coordinates provides a three-dimensional, high resolution, mathematical model of the surface 62 of the glass sheet G by way of the series of (x, y, z) coordinates. In one example, the matrix provides a mathematical model with over one million sets of coordinates for a sheet G. For example, the model may have point density of 1,000,000 sets of coordinates per square meter of sheet surface 62, or on the order of one set of coordinates per square millimeter of sheet surface 62.

In the examples described with respect to FIGS. 1-2, the glass sheet G moves on a conveyor relative to the optical system 14. In this scenario, the laser 50 and the camera 72 are fixed relative to one another, and the glass sheet G passes underneath. In another example, the glass sheet G may be fixed, and the laser beam emitted from the laser 50 may be scanned across the first surface 62 of the glass sheet G by a one-axis or a two-axis mirror galvanometer, or the like. In this scenario, the computer 80 also receives an input indicative of the beam steering angle provided by the galvanometer in order to determine the angles associated with the distances D1, D2 associated with the location of the moving lines 66, 68 along the glass sheet.

In further examples, the optical inspection system 14 may be used to inspect the second side 64 of the glass sheet G, and create a corresponding three-dimensional matrix or point cloud representative of the surface 64 of the sheet G.

The matrix or point cloud for the glass sheet G provide a high resolution three-dimensional map of the surface of the glass sheet G. The coordinates in the matrix may be used in comparison with a mathematical model of the glass sheet G to determine if the shape of the glass sheet is within a specification for the shape, e.g. the curvature. Furthermore, the coordinates in the matrix may be used in comparison with a mathematical model of the glass sheet G to determine if the surface of the glass sheet G is within a specification or standard for optical reflectance from the surface.

The matrix and resulting model may be used with the system 10 to provide gauging for the glass sheet G, as a pass/fail inspection system to correct for drift in the manufacturing process or prevent the system 10 from going out of specification, to create an optical reflectance model for the glass sheet G.

The computer(s) 16, 80 may be programmed to present information related to the three-dimensional map from the matrix in graphical (e.g., color-coded images) and/or statistical forms. In various examples, statistical data can be derived and reported for the glass sheet or predefined areas of the glass sheet, including z-distances, standard deviations, and other surface fairing or optical reflectance metrics.

The inspection system 14 may also include a glass sheet part identifier, which may be provided by camera 72 or another element, to identify the glass sheet as one of a set of known part shapes stored in memory in the computer 80, with each known part having an associated shape standard, and optical reflectance standard for comparison to the map in the matrix. The system 10, 14 may be programmed by the user to graphically and/or numerically display various optical or shape indicia of the glass sheet G detected by apparatus 14, for example, via a user interface and display screen 20, including those indicia most relevant to industry standards, or other indicia considered relevant in the industry to the analysis of the optical reflectance quality of formed and fabricated glass sheets. The system 10 may, as well, be programmed to display the locations of small defects identified by apparatus 14.

Selected data output by the disclosed in-line optical inspection system 10, 14 may also be provided as input to the control logic for an associated glass sheet heating, bending, and tempering system (or automotive windshield fabrication system) to allow the control(s) for one or more of the stations the glass sheet system to modify its(their) operating parameters as a function of the optical data developed from previously processed glass sheets.

Figure 10:
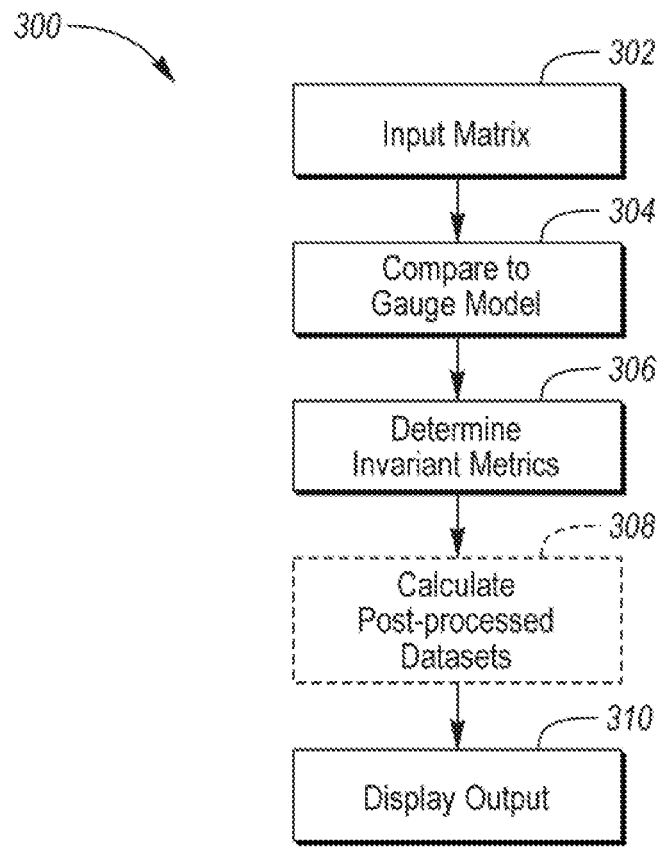
FIG. 10 is a flow chart of a method of gauging a surface using a surface map as determined from the method of FIG. 6.

FIG. 10 is a flow chart for a method 300 for use in gauging a part, such as a glass sheet G, using the matrix or point cloud for a surface of the glass sheet as determined by the computer 80 using the optical system 14. In various embodiments, steps in the method 300 may be omitted or rearranged, or additional steps may be provided.

At step 302, a matrix or point cloud for a surface of a glass sheet G as determined above using the optical system and method 200 is input into a processor unit by the computer 80. The matrix may be representative of an entire first surface of the glass sheet G, or may include datasets for only a selected surface region of the glass sheet G.

At step 304, the computer 80 refers to an appropriate gauge model for the glass sheet G. The gauge model may be provided using computer aided design (CAD) models and/or data, or other mathematical models or representations of dimensions or shapes. The computer may determine the correct gauge model to use from one of several models stored in memory for glass sheets G of various shapes and/or sizes. The computer 80 then inputs the selected gauge model into the processor.

At step 306, the computer 80 determines invariant metric data for the glass sheet in comparison to the gauge model. In one example, the computer may determine z-distance distances for the datasets or surface of the glass sheet G in comparison to the gauge model. The computer may calculate a normal vector distance from each of the datasets or surface of the sheet G to the gauge model. Alternatively, the computer may calculate a vertical distance, or z-distance from the each of the datasets or surface of the sheet G to the gauge model.

The computer may be configured to gauge the entire glass sheet G with reference to the matrix or point cloud. In other examples, the computer may gauge only selected region(s) or portion(s) of the glass sheet G or have additional gauging points in specified regions, e.g. a perimeter region, or a region intended for optical use such as with a heads up display or a camera or other sensor. In one example, the computer uses selected regions of the glass sheet G to simulate a contact gauging method.

In further examples, and as shown as optional block 308 in broken lines, the computer may perform calculations or sub-routines on neighborhoods of points to provide a post-processed surface datapoint or dataset for use in determining the invariant metric. In one example, the computer performs an interpolation, an averaging, or another mathematical function such as thresholding or the like on adjacent points or datasets to calculate a post-processed dataset for that neighborhood. This may provide improved gauging and invariant metrics by eliminating outlier datasets such as those caused by surface dust, etc.

In other examples, the computer may determine standard deviations of the z-distances, or another invariant metric for the surface and the glass sheet G, such as a calculated radius of curvature, or other shape gauging metric. The invariant metrics may be entered in a gauging matrix or point cloud for the glass sheet G.

At step 310 the computer 80 outputs the information related to the gauging of the surface, including any invariant metrics, e.g. the gauging matrix. The computer may further analyze information in the gauging matrix to determine if one or more metric exceeds a threshold value. The computer may additionally provide information related to the gauging to a user, for example, via a color-coded map of the glass sheet or via numerical or other forms of presentation, such as a table. The computer may additionally provide information from the gauging to a manufacturing process step for the glass sheet G as a part of a control feedback loop.

Figure 11A:
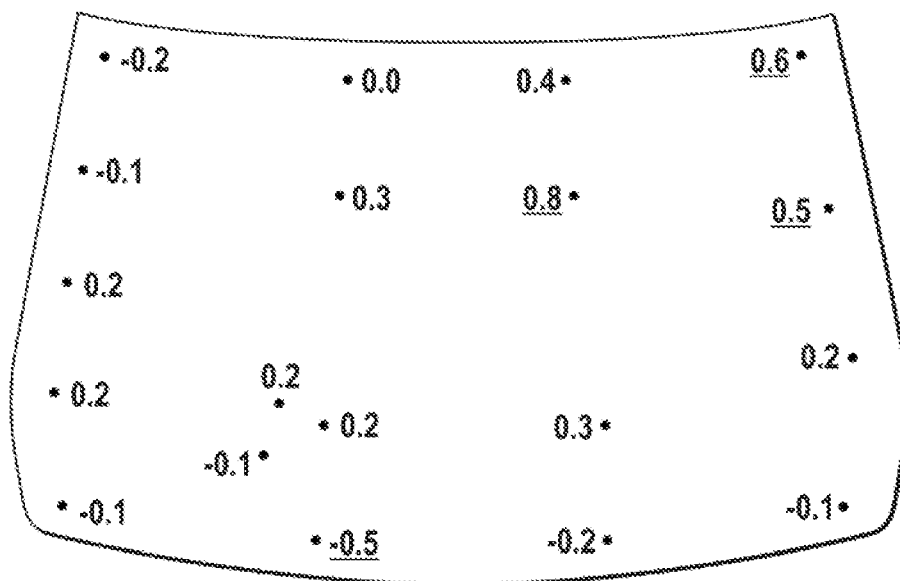
FIGS. 11A and 11B are representative system outputs for display to a user as determined using the method of FIG. 10.
Figure 11B:
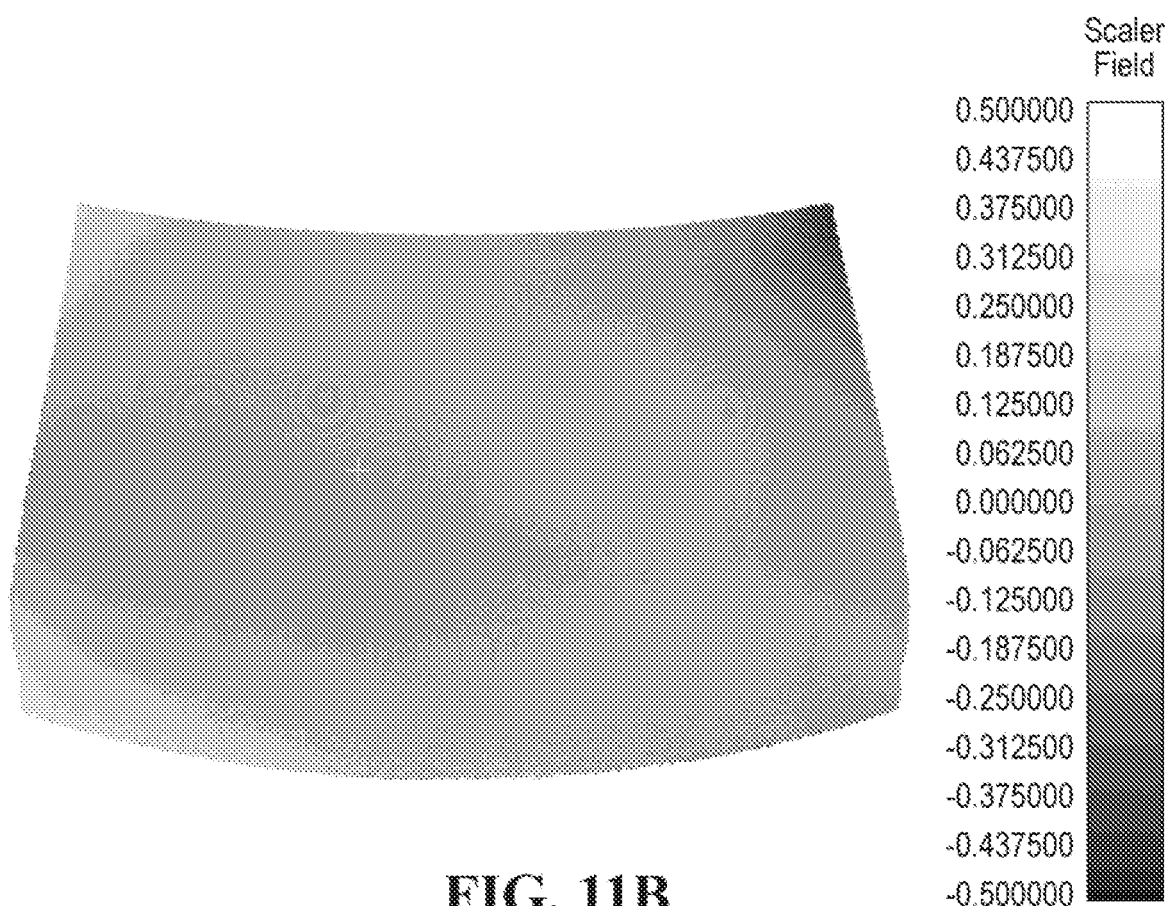

FIGS. 11A and 11B illustrate representative examples of outputs from method 300 for display to a user. FIG. 11A illustrates a simplified point map for a glass sheet G or region of a glass sheet G, and provides a representative example of the system output. Gauging points have associated invariant metrics listed such as differential values based on the normal, vertical, or other distance from the gauging value. If the differential value is beyond a specified threshold or outside an allowable tolerance, it may be flagged to be readily apparent to a user. In the example shown, the values correspond to a normal vertical distance from the gauging model and are provided in millimeters, although other units are contemplated. Furthermore, values that are underlined lie outside the threshold or allowance and may be flagged for a user.

FIG. 11B illustrates a map for a glass sheet G or region of a glass sheet G, with different shades corresponding to different ranges of differential values based on the normal, vertical, or other distance from the gauging value, and provides another representative example of the system output. If the differential value is beyond a specified threshold or outside an allowable tolerance, it may be flagged to be readily apparent to a user. The tolerances or thresholds may be set at different values for different regions of the panel based on intended use and requirements for the sheet. For the example shown, the differentials are provided in millimeters, although other units are also contemplated.

The method 300 provides for non-contact gauging of the surface and of the glass sheet G, allows for on-line monitoring and inspection of parts, and allows for rapid and easy gauging of a series of different parts, or use of multiple gauge models. Furthermore, non-contact gauging via method 300 provides for reduced time and expenses associated with gauging a part, as the gauge model may be easily created, changed, or updated using CAD data, and does not require the use of precision measurement gauging tools for contact gauging that are part specific.

Figure 12:
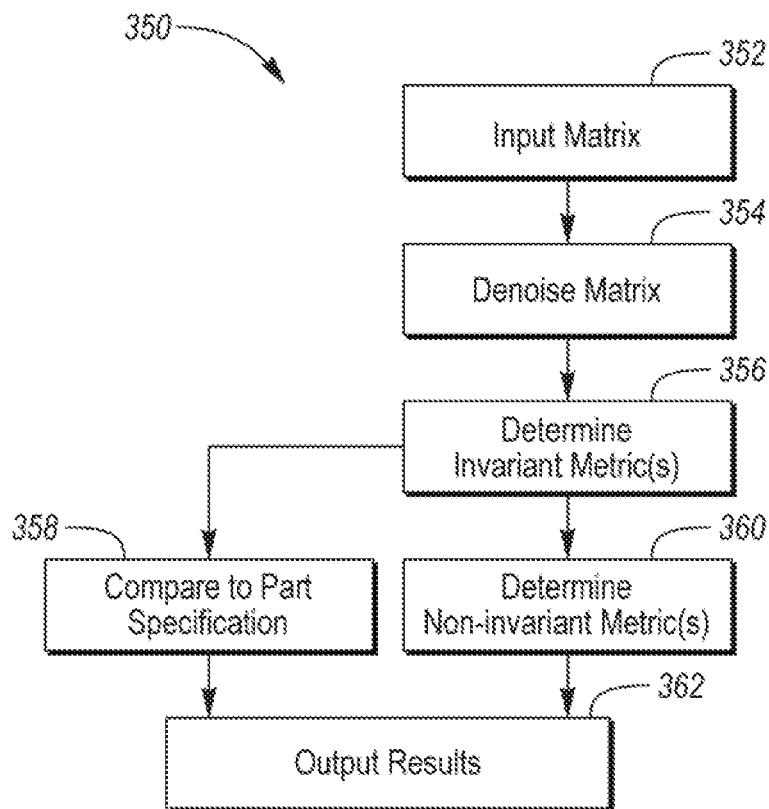
FIG. 12 is a flow chart of a method of modeling and determining optical reflectance and distortion of a surface using a surface map as determined from the method of FIG. 6.

FIG. 12 is a flow chart for a method 350 for use in determining and modeling the optical reflectance of a part, such as a glass sheet G, using the matrix or point cloud for a surface of the glass sheet as determined by the computer 80 using the optical system 14. In various embodiments, steps in the method 300 may be omitted or rearranged, or additional steps may be provided.

At step 352, a matrix or point cloud for a surface of a glass sheet G as determined above using the optical system and method 200 is input into a processor unit by the computer 80. The matrix may be representative of an entire first surface of the glass sheet G, or may include datasets for only a selected surface region of the glass sheet G.

At step 354, the computer 80 performs post-processing operation(s) on the matrix or point cloud. In one example, the computer 80 modifies or denoises the matrix or point cloud to remove certain points or artifacts from the point cloud. For example, the computer 80 may remove or modify points in the point cloud that are adjacent to or within a specified distance, e.g. one to two millimeters, of the edge of the panel G to remove points that have an edge effect or bias in their measured location, e.g. caused by a beam steering effect, and/or a bias in the calculated line center that is introduced based on the width of the laser line or visible light in conjunction with the edge of the panel running non-perpendicularly to the line or sheet. Additionally, fluorescent, visible light may appear immediately outside of the panel G and may be caused for example by a grind or other parameter of the panel causing propagation of the light, thereby causing additional artifact points in the point cloud or matrix. In one example, these inaccurate or artifact points form a curve having an opposite curvature sign than the adjacent panel G, or a knee in a curve is formed between the inaccurate or artifact points and the adjacent panel G, such that the computer 80 may truncate or delete these points from the point cloud or matrix using the inflection point or the knee as the boundary. Although this denoising step is described with respect to denoising a point cloud created when measuring the surface of a glass sheet G using fluoresced visible light from a laser sheet, the denoising step may also be applied to other vision and measurement systems for use in denoising edge effects.

The computer 80 also performs a denoise algorithm on the point cloud or matrix at step 354. According to one example, denoising may be provided by averaging of normal vectors in a neighborhood of datasets, and then updating the datasets using the averaged normal vector to create a post-processed dataset that matches the change of the normals. In one non-limiting example, a point cloud of datasets is triangularly meshed with each dataset acting as a vertice. In other examples, other mesh shapes may be used. For each mesh triangle, a normal vector is calculated. Diverging normal vectors may be indicative of noise in the point cloud, while converging normal vectors may be indicative of a smoother surface for the point cloud. The point cloud is smoothed by averaging or otherwise mathematically combining normal vectors for neighborhoods or groupings of mesh triangles, and the neighborhoods may be defined as meshes sharing a common vertice or sharing common edge(s). Each averaged normal vector is used to adjust the coordinates for the associated vertice to create a post-processed vertice or dataset in a post-processed, denoised point cloud or matrix. In other examples, other denoising algorithms may be provided and may be based on mathematical algorithms associated with surface fairing techniques such as those described by: Gabriel Taubin "A signal processing approach to fair surface design" SIGGRAPH '95 Proceedings of the 22nd annual conference; Hirokazu Yagou, et al "Mesh Smoothing via Mean and Median Filtering Applied to Face Normals" GMP '02 Proceedings of the Geometric Modeling and Processing—Theory and Applications (GMP '02); Shachar Fleishman, et al "Bilateral mesh denoising" SIGGRAPH '03 ACM SIGGRAPH 2003 Papers; and Thouis R. Jones, et al "Non-iterative, feature-preserving mesh smoothing" SIGGRAPH '03 ACM SIGGRAPH 2003 Papers.

According to another non-limiting example, the computer 80 performs a denoise algorithm on the point cloud or matrix using a moving least squares method to smooth and interpolate the data. According to the present disclosure and for a given data point in the point cloud, a number of neighboring points in the point cloud are least squares fit to a function by the computer 80. In one example, the function may be a polynomial. A post-processed data point is determined by moving the original given point in the point cloud to the determined polynomial surface. The computer 80 iterates the denoising through the point cloud to create a post-processed, denoised point cloud or matrix. Examples of a moving least squares method and its application to surfaces may be found in Lancaster, Peter, and Kes Salkauskas, "Surfaces generated by moving least squares methods," Mathematics of computation 37.155 (1981): 141-158; and Alexa, Marc, et al. "Computing and rendering point set surfaces." IEEE Transactions on visualization and computer graphics 9.1 (2003): 3-15.

At step 356, the computer 80 determines or calculates one or more invariant metrics of the surface from post-processed datasets in the denoised matrix or point cloud, or for one or more selected regions of the surface. Invariant metrics may include horizontal curvature, vertical curvature, radius of curvature, principal curvature, Gaussian curvature, mean curvature, derivatives or rates of change of one or more of the curvatures, diopter or optical power metrics, and the like.

At step 358, the computer may determine if the invariant metrics indicative of optical reflectance of the surface are within an optical reflectance specification designated for the surface of the glass sheet G, or a region of the surface. The computer may compare one or more of the invariant metrics to a corresponding design metric for the glass sheet G. For example, the optical reflectance specification may be a standard or thresholded invariant metric for the glass sheet G. In one example the specification includes a metric such as a calculated curvature from a computer-aided engineering (CAE) model or other model data for the glass sheet G. The computer may compare invariant metrics to threshold values or create a color-coded map or other visual output to indicate if the glass sheet or a region of the glass sheet is within the predetermined specification, or to compare the surface to the predetermined specification. In further examples, the computer may use a mathematical function of more than one invariant to provide a score or other indication of the optical reflectance in comparison to the specification that weights or otherwise factors the different invariants and regions of the surface as it relates to the optical reflectance.

At step 360, and in some embodiments, the computer 80 determines or calculates variant metrics for the glass sheet G. In one example, the computer 80 creates a simulated reflected grid, zebraboard, or other image for a simulated visual representation of the optical reflectance and any distortion. The computer algorithm used to create the simulated reflected image may use techniques such as ray tracing using the post-processed vertices in the denoised matrix and the normal vectors calculated from each of the post-processed vertices. For example and with reference to the use of ray tracing, a ray from the post-processed vertice in the denoised point cloud strikes a virtual camera at a pixel at an angle to the normal vector, and since angle of incidence is equal to angle of reflection, a ray from the same post-processed vertice on the point cloud is therefore known and the point of intersection with a virtual gridboard may be determined. A reflected image such as a reflected gridboard or zebraboard may then be constructed using the pixels on the virtual camera and the points on the virtual gridboard, as they correspond one-to-one. The algorithm used by the computer to simulate the reflected grid or zebraboard may be tuned or calibrated by using a real reflected image of a grid or zebraboard at the same angle of incidence, camera settings, etc. as were used in the algorithm. In a further example, the computer may assemble a series of simulated grids or simulated zebraboards, for example, taken at varying angles of incidence, to provide a movie or flipbook of the zebraboards for visual display to a user to simulate the user scanning a zebraboard from changing positions relative to the zebraboard.

Figure 13:
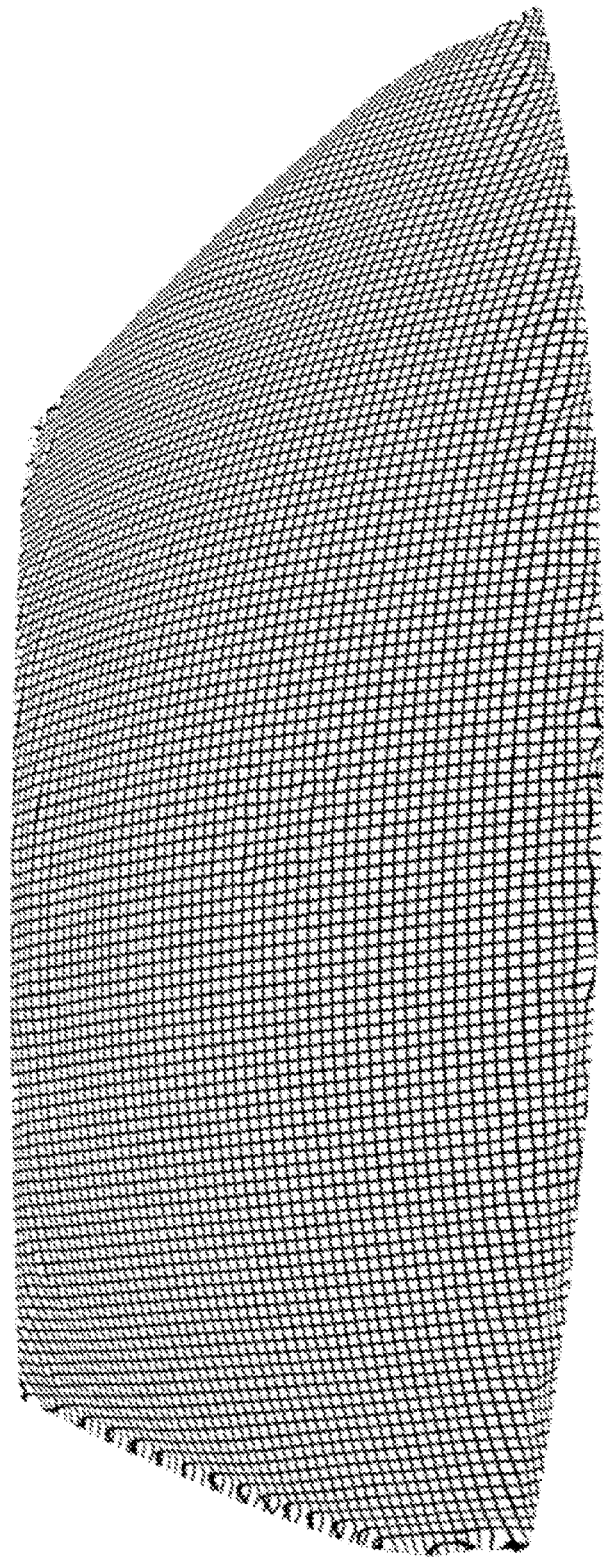
FIG. 13 is a representative system output for display to a user as determined using the method of FIG. 12.

At step 362, the computer 80 outputs the information related to the simulated optical reflectance and distortion of the surface, including any variant or invariant metrics, visual representations or mapping of invariant data or the simulated zebraboard, or other calculations or simulations. In one example, the computer 80 display the information on a display screen or other user interface. FIG. 13 illustrates a representative example of a simulated reflected optical image of a gridboard as constructed using the methods 200, 350 as described herein. The computer may additionally provide this information to a manufacturing process step for the glass sheet G as a part of a control feedback loop.

The method 350 provides for non-contact inspection and determination of the optical reflectance and any distortion of the surface and of the glass sheet G, allows for on-line monitoring and inspection of parts, and allows for rapid and easy inspection of a series of different parts. Furthermore, non-contact optical reflective inspection via method 350 provides for reduced time and expenses associated with inspecting a part, and may additionally provide non-subjective metrics for use in determining if the part has passed the specification.

In other examples, and depending on the manufacturing technique used to form the glass sheet, the first and second surfaces 62, 64 may emit light at different wavelengths in response to excitation from the laser 50. In one example, the glass sheet G is formed using a float glass process and has a higher concentration of tin on one surface compared to the other surface. In this scenario, the surface with the higher tin concentration fluoresces at a different intensity and/or wavelength than the other surface, and the inspection system may further be used to identify one side of the sheet from the other based on the different intensity and/or wavelength $\lambda_2$ of the emitted light. For example, for a glass sheet with a first surface having a higher tin concentration than a second surface, the first surface may fluoresce at a different intensity and/or wavelength than the second surface, and furthermore the first surface may fluoresce at a high intensity and/or shorter wavelength than the second surface. Furthermore, the control unit and computer 80 may modify the intensity of the laser 50 based on the surface of the glass sheet that is facing the laser, and/or adjust camera settings such as gain or image processing settings. For example, for a glass sheet with a first surface with a higher tin concentration than a second surface, the laser intensity may be reduced for the first surface compared to the second surface, e.g. to prevent oversaturation of the camera sensor. Alternatively or additionally, the gain may be increased for the second side, or additional image processing steps for noise reduction may be needed for the second side.

Furthermore, a system 10 may be provided with more than one optical inspection system 14, for example, for use with larger glass sheets G, for decreased scanning times, or for increased accuracy of measurement.

By using a system 14 with a light source that is non-transmissive to the glass sheet G, a measurement of a surface of the sheet G may be provided, issues arising in other systems using visible light to interrogate the glass sheet and resulting scatter or reflectance from both the front and rear surfaces 62, 64 are also avoided. Similarly, the measurement of the light emitted from the glass sheet G is simplified by being in the visible spectrum such that ultraviolet sensors are not required.

In further embodiments, the optical system may be used to form a three-dimensional surface map for an object other than a glass sheet G. In one, non-limiting example, an optical system with a laser emitting light in another wavelength, such as a visible wavelength, may be used to scan an object having a diffuse surface. The optical system uses one or more camera(s) with the methods as described above to determine a three-dimensional surface map of the diffuse surface.

While various examples of the disclosure are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An optical inspection system comprising:
   an ultraviolet laser and associated optics forming a planar laser sheet directed to a glass sheet, wherein the planar laser sheet intersects a surface of the glass sheet thereby causing the surface of the glass sheet to fluoresce and form a visible wavelength line on the surface;
   a first camera having a first image sensor for detecting the visible wavelength line across a portion of a width of the glass sheet;
   a second camera having a second image sensor for detecting the visible wavelength line across another portion of a width of the glass sheet, wherein the first camera and the second camera have separate and overlapping fields of view on the surface of the glass sheet; and
   a control system configured to (i) receive image data indicative of the visible wavelength line from the first camera, (ii) analyze the data from the first camera to determine first and second coordinates in a first series of coordinates associated with the line, (iii) triangulate a third coordinate associated with each of the first and second coordinates in the first series of coordinates, (iv) create a first three-dimensional map of the surface of the glass sheet as a function of the first series of coordinates, (v) receive image data indicative of the visible wavelength line from the second camera, (vi) analyze the data from the second camera to determine first and second coordinates in a second series of coordinates associated with the line, (vii) triangulate a third coordinate associated with each of the first and second coordinates in the second series of coordinates, (viii) create a second three-dimensional map of the surface of the glass sheet as a function of the second series of coordinates, and (ix) form a combined map using the first map and the second map.

2. The optical inspection system of claim 1 wherein the control system is further configured to move the first map relative to the second map using a rigid transformation to align the first map with the second map, and subsequently remove series of coordinates from the overlapping field of view of one of the first map and the second map to form the combined map.

3. The optical inspection system of claim 1 wherein the first camera and the second camera are positioned on one side of the planar laser sheet.

4. The optical inspection system of claim 1 wherein the planar laser sheet is positioned between the first camera and the second camera.

5. The optical inspection system of claim 1 further comprising:
   a third camera having a third image sensor for detecting the visible wavelength line across a third portion of a width of the glass sheet; and
   a fourth camera having a fourth image sensor for detecting the visible wavelength line across a fourth portion of a width of the glass sheet;
   wherein the first camera, the second camera, the third camera, and the fourth camera have separate and overlapping fields of view on the surface of the glass sheet.

6. The optical inspection system of claim 1 further comprising a conveyor configured to translate at least one of the glass sheet and the laser relative to one another;
   wherein the laser, planar laser sheet, and camera are fixed relative to one another; wherein the control system is further configured to receive a series of data indicative of a series of visible wavelength lines from each camera as measured across the glass sheet, each line corresponding to a different location along the surface of the glass sheet; and
   wherein the control system is further configured to analyze each of the series of visible wavelength lines to determine first and second coordinates in a series of coordinates associated with each line, triangulate a third coordinate associated with each of the first and second coordinates in each of the series of coordinates, and create each three-dimensional map of the surface of the glass sheet from each of the series of coordinates associated with each camera.

7. The optical inspection system of claim 1, wherein the control system is further configured to analyze the data from each camera using a predetermined line width region to determine the first and second coordinates in each series of coordinates associated with the line, wherein the first and second coordinates in each series of coordinates lies within the line width region.

8. The optical inspection system of claim 7 wherein the line width region is a function of pixels and/or a greyscale threshold.

9. The optical inspection system of claim 1, wherein the surface of the glass sheet is a first surface;
   wherein the glass sheet has a second surface opposite to the first surface; and
   wherein the control system is further configured to adjust an intensity of the laser in response to one of the first and second surfaces comprises a higher concentration of tin than the other of the first and second surfaces.

10. The optical inspection system of claim 9 wherein the control system is further configured to operate the laser at a lower intensity when the first surface comprises the higher concentration of tin.

11. The optical inspection system of claim 1 wherein the control system is further configured to determine a simulated optical reflectance of the surface using the combined map of the surface.

12. The optical inspection system of claim 11 further comprising a display in communication with the control system;
wherein the control system is further configured to output a map of invariant data and/or a simulated reflected optical image of one of a gridboard and a zebraboard to the display.

13. The optical inspection system of claim 1 wherein the control system is further configured to gauge the glass sheet using the combined map of the surface.

14. The optical inspection system of claim 1 wherein the control system is further configured to denoise the combined map by meshing the first and second series of coordinates in the combined map, averaging normal vectors for mesh neighborhoods, and adjusting a position of the coordinates in the first and second series of coordinates to create a series of post-processed coordinates in the combined map.

15. The optical inspection system of claim 1 wherein the control system is further configured to denoise the combined map by removing points adjacent to an edge of the three-dimensional map using one of an inflection point and a knee.

16. A method of using an optical inspection system comprising:
forming and directing a planar laser sheet from an ultraviolet laser and associated optics to a surface of a glass sheet;
exciting the surface of the glass sheet at an intersection of the planar laser sheet and the surface to form a visible wavelength line on the surface of the glass sheet;
imaging the visible wavelength line using a first camera and a second camera, the first camera and the second camera having separate and overlapping fields of view on the surface of the glass sheet;
determining first and second coordinates in a first series of coordinates associated with the visible wavelength line by analyzing imaging data from the first camera;
determining a third coordinate associated with each of the first and second coordinates in the first series of coordinates associated with the visible wavelength line by triangulation;
determining first and second coordinates in a second series of coordinates associated with the visible wavelength line by analyzing imaging data from the second camera;
determining a third coordinate associated with each of the first and second coordinates in the second series of coordinates associated with the visible wavelength line by triangulation;
creating a first three-dimensional map of the surface of the glass sheet as a function of the first series of coordinates;
creating a second three-dimensional map of the surface of the glass sheet as a function of the second series of coordinates; and
combining the first and second three-dimensional maps to form a combined map of the surface of the glass sheet.

17. The method of claim 16 further comprising:
moving the glass sheet relative to the laser, planar laser sheet, and camera; and
imaging a first series of visible wavelength lines using the first camera as the glass sheet moves relative to the planar laser sheet;
imaging a second series of visible wavelength lines using the second camera as the glass sheet moves relative to the planar laser sheet;
wherein the first three-dimensional map of the surface is created as a function of the first series of coordinates in the first series of lines; and
wherein the second three-dimensional map of the surface is created as a function of the second series of coordinates in the second series of lines.

18. The method of claim 16 further comprising
calculating an invariant metric of the glass sheet using a set of coordinates in the combined map in comparison with a gauge model for the surface; and
outputting the invariant metric to provide gauging information for the glass sheet.

19. The method of claim 16 further comprising denoising the combined map of the surface; and
calculating an invariant metric of the glass sheet using at least one set of coordinates from the combined map in comparison with an optical reflectance specification designated for the surface of the glass sheet; and
outputting the invariant metric to provide optical reflectance information for the surface.

20. The method of claim 19 further comprising constructing a simulated reflected optical image of one of a gridboard and a zebraboard by ray tracing datasets from the denoised map; and
outputting the simulated image.

* * * * *